United States Patent
Ong et al.

(10) Patent No.: US 11,580,254 B2
(45) Date of Patent: Feb. 14, 2023

(54) SYSTEMS AND METHODS FOR RECORD LINKAGE

(71) Applicant: The Regents of the University of Colorado, a body corporate, Denver, CO (US)

(72) Inventors: Toan C. Ong, Centennial, CO (US); Lisa M. Schilling, Denver, CO (US); Michael G. Kahn, Denver, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 309 days.

(21) Appl. No.: 16/641,569

(22) PCT Filed: Aug. 24, 2018

(86) PCT No.: PCT/US2018/047961
§ 371 (c)(1),
(2) Date: Feb. 24, 2020

(87) PCT Pub. No.: WO2019/040874
PCT Pub. Date: Feb. 28, 2019

(65) Prior Publication Data
US 2020/0184100 A1 Jun. 11, 2020

Related U.S. Application Data

(60) Provisional application No. 62/562,243, filed on Sep. 22, 2017, provisional application No. 62/549,857, filed on Aug. 24, 2017.

(51) Int. Cl.
*G06F 21/62* (2013.01)
*G06F 16/182* (2019.01)
(Continued)

(52) U.S. Cl.
CPC ...... *G06F 21/6245* (2013.01); *G06F 9/44505* (2013.01); *G06F 16/137* (2019.01);
(Continued)

(58) Field of Classification Search
CPC .............. G06F 21/602; G06F 21/6209; G06F 21/6245; G06F 21/6254; G06F 2221/0753;
(Continued)

(56) References Cited

U.S. PATENT DOCUMENTS 8,401,185 B1 * 3/2013 Telang ................... H04L 9/083
713/193
8,843,997 B1 9/2014 Hare
(Continued)

OTHER PUBLICATIONS

Vatsalan et al., An Evaluation Framework for Privacy-Preserving Record Linkage, 2014.*
(Continued)

*Primary Examiner* — Minh Dinh

(57) ABSTRACT

A record linking platform having a computer system with a processor, multiple databases each having records, such as private health information. Each of the multiple databases are not in direct communication with one another. A control center is in communication with the different entities, the control center configured to: generate a site configuration file, a key configuration file, and a broker configuration file. A keymaster configured to: receive the key configuration file, generate a hash key, and transmit the hash key to the databases. The databases configured to: receive the site configuration file and the hash key; process the records to generate evaluation records data that conform to a data model specified in the site configuration file; and encrypt the evaluation records using the hash key. An honest broker configured to: receive the broker configuration file and the
(Continued)

encrypted evaluation records; and link the encrypted evaluation records without decrypting.

20 Claims, 14 Drawing Sheets

(51) Int. Cl.
    *G06F 16/13*         (2019.01)
    *G06F 9/445*        (2018.01)
    *G06F 21/60*        (2013.01)

(52) U.S. Cl.
    CPC ........ *G06F 16/1824* (2019.01); *G06F 21/602* (2013.01); *G06F 2221/0753* (2013.01); *G06F 2221/0755* (2013.01)

(58) Field of Classification Search
    CPC ......... G06F 2221/0755; G06F 9/44505; G06F 16/137; G06F 16/1824; H04L 63/062
    See application file for complete search history.

(56) References Cited

U.S. PATENT DOCUMENTS

| | | |
|---|---|---|
| 2012/0159637 A1 | 6/2012 | Dove et al. |
| 2015/0213288 A1 | 7/2015 | Bilodeau et al. |
| 2019/0018983 A1* | 1/2019 | Anderson ........... G06F 21/6245 |

OTHER PUBLICATIONS

International Application No. PCT/US2018/047961, International Search Report & Written Opinion, 12 pages, dated Nov. 14, 2018.

* cited by examiner

SYSTEMS AND METHODS FOR RECORD LINKAGE

CROSS REFERENCE TO RELATED APPLICATIONS

This application claims priority to U.S. Provisional Patent Application Ser. No. 62/562,243, filed Sep. 22, 2017, and U.S. Provisional Patent Application Ser. No. 62/549,857, filed Aug. 24, 2017, both of which are incorporated herein by reference in their entirety for all purposes.

TECHNICAL FIELD

Various embodiments of the present technology generally relate to systems and methods for record linkage. More specifically, some embodiments of the present technology generally relate to privacy-preserving record linkage.

BACKGROUND

With the proliferation of electronic devices and corresponding use of electronic records, more information is being stored than ever. Typically, there is no common formatting or shared record. Instead, each entity creates, stores, and manages their own records. Rarely does one entity have access to the records of another entity. Even if access to the multiple records were available, merging the data is not a simple task as each entity often acts independently and creates individualized record formats. In addition, typographical errors, outdated information, name changes, and other differences in the underlying data can make matching and merging the data even more difficult.

Record linkage generally refers to the process of linking records or data entries that represent the same entity in one or more databases. Similarly, privacy-preserving record linkage (PPRL) generally refers to record linkage without revealing clear-text linkage data or too much sensitive information about the units represented (e.g., through encryption or hashing). For example, electronic health records (EHRs) are being adopted across diverse clinical practice settings. EHRs enable clinical investigators to access detailed longitudinal patient-level and practice-level data not previously available. Rapidly evolving sources of rich health and wellness data include personal medical records, electronic diaries, online social media, disease-specific virtual communities, registries, and real-time personal health monitoring devices. Important data for research also exists in operational, administrative, and financial systems.

Linking data from these various sources presents many challenges. Moreover, some fields may be missing from one set of records or populated with outdated or incorrect information. As such, identifying data entries that should be combined may be challenging. There exists for improved systems and techniques for identifying data entries that should be combined.

SUMMARY

Various embodiments of the present technology generally relate to systems and methods for record linkage. More specifically, some embodiments of the present technology generally relate to privacy-preserving record linkage. In some embodiments of the present technology, a method for linking records across multiple data sites are provided. In accordance with various embodiments, the data sites can have a plurality of private information contained in electronic data. At a control center server, a first configuration file can be generated. The first configuration file can contain instructions on how to manipulate the plurality of private information contained in the electronic data. The configuration file can be transferred from the control center server to the data site and the keymaster where the configuration file can be loaded. A plurality of private information contained in the electronic record at the data site can be manipulated to produce clean and normalized data. A keymaster server can generate a hash key which can be transferred from the keymaster server to the data site. The data site can apply the hash key to the clean data to produce hashed clean data which can be transferred to an honest-broker server.

In some embodiments, a record linking platform system can include one or more computer readable storage media, a processing system operatively coupled with the one or more computer readable storage media, and program instructions stored on the one or more computer readable storage media that when executed by the processing system cause the record linkage platform to generate, at a control center server, a first configuration file. In some embodiments, the configuration file can contain instructions on how to manipulate the private information contained in the electronic data. The configuration file can then be transferred from the control center server to the data site which can load the configuration file and manipulate the private information contained in the electronic data to produce clean data. A keymaster server can generate a hash key which can be transferred from the keymaster server to the data site. At the data site, the clean data can be hashed to produce hashed clean data which can be transfer to a third-party broker server.

In some embodiments, a method can include receiving, at a record linkage platform, a request to link multiple data sets. The multiple data sets can be stored separately at different sites by different entities and not in direct communication with one another. In response to the request to link the multiple data sets, a set of configuration files can be generated including a site configuration file for each of the different sites, a key configuration file for a keymaster, and a broker configuration file for an honest broker. The site configuration file can identify a data model that each of the multiple sites will format entries of the data sets into. In some embodiments, the key configuration file can include information on how the keys should be generated. For example, the key configuration file can identify an encryption method, length of the keys, number of keys to be generated, and the like. The broker configuration file can identify the multiple data sets (set by the job creator) to be linked. The site configuration can be transmitted to each of the different sites, the key configuration file to the keymaster, and the broker configuration file to the honest broker.

In one or more embodiments, a record linking platform can include a processor and multiple databases each having stored thereon records. Each of the multiple databases are owned by different entities. A control center can be configured to receive a request to link the records on the multiple databases and generate a site configuration file, a key configuration file, and a broker configuration file. A keymaster can be configured to download or pull the key configuration file from a designated location, generate a hash key, and transmit the hash key to any site hosting the multiple databases. A site can be configured to receive the site configuration file and the hash key, preprocess the records to generate evaluation records data that conform to a data model specified in the site configuration file, and hash and/or encrypt the evaluation records using the hash key. An honest broker can be configured to receive the broker configuration file along with the encrypted evaluation records and link the hashed and/or encrypted evaluation records without dehashing and/or decrypting.

BRIEF DESCRIPTION OF THE DRAWINGS

Embodiments of the present technology will be described and explained with the accompanying drawings.

Figure 1:
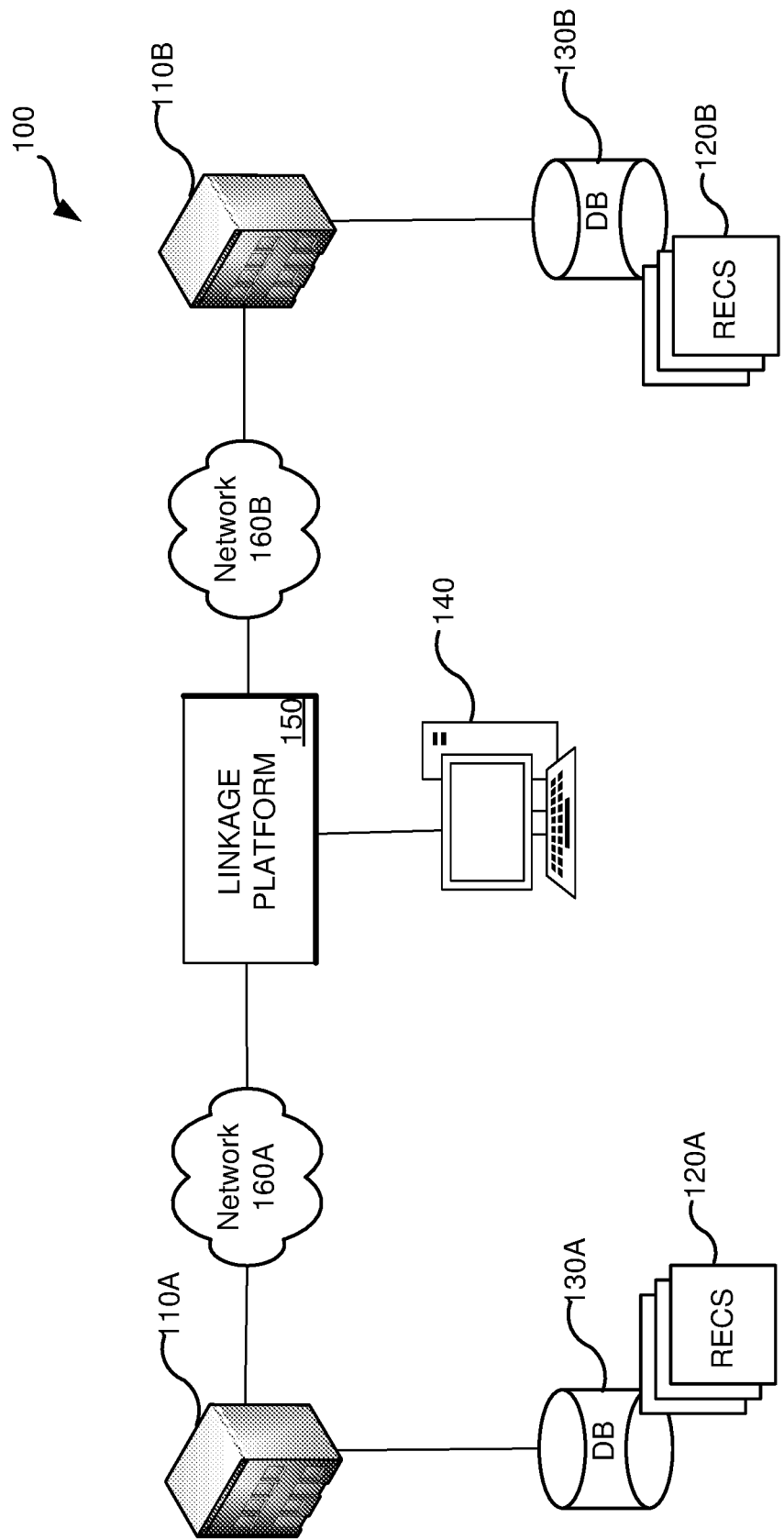
FIG. 1 illustrates an example of a linkage platform environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to record linkage. More specifically, some embodiments relate to privacy-preserving record linkage. With the proliferation of electronic devices and records, more information is being stored than ever. These electronic records are created by various entities and stored in separate databases under different management. Rarely does one entity have access to the records of another entity. Even if access to the multiple records were available, merging the data is not a simple task as each entity often acts independently and creates individualized record formats. Moreover, some fields may be missing from one set of records or populated with outdated or incorrect information. As such, identifying data entries that should be combined can be challenging.

Record linkage generally refers to the process of linking records that represent the same entity in one or more databases. Similarly, privacy-preserving record linkage (PPRL) generally refers to record linkage without revealing clear-text linkage data using data encryption. For example, electronic health records (EHRs) are being adopted across diverse clinical practice settings. EHRs enable clinical investigators to access detailed longitudinal patient- and practice-level data not previously available. Rapidly evolving sources of rich health and wellness data include personal medical records, electronic diaries, online social media, disease-specific virtual communities, registries, and real-time personal health monitoring devices. Important data for research also exists in operational, administrative, and financial systems. Linking data from these various sources presents many challenges.

Various embodiments of the present technology provide for a record linkage framework which performs both clear-text and privacy-preserving record linkage operations including linkage job configuration and management, data normalization, data encryption and hashing, data linkage, data deduplication, and linked data dissemination. Some embodiments support both two-party and centralized record linkage via a trusted third party and a keymaster to generate and manage hash keys. In some embodiments, various components can take advantage of a modular software architecture which allows each module in the system to be updated, added or removed without the need to change the source code of the core framework. Various embodiments of the present technology support a centralized linkage configuration mechanism and dynamic software update management.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here may be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one embodiment of the present technology and may be included in more than one embodiment. In addition, such phrases do not necessarily refer to the same embodiments or different embodiments.

FIG. 1 illustrates an example of an environment 100 in which some embodiments of the present technology may be utilized. As illustrated in FIG. 1, communications environment 100 multiple entities 110A-110B which can store various independent records 120A-120B in databases 130A-130B. The records 120A-120B may be any type of records, including but not limited to, medical records, health information, employment records, financial records, educational records, and the like. Records 120A-120B may be stored in different formats, .doc, .xml, and the like. Records 120A-120B may be organized differently. For example, one data set may have the organize data as {medical record number, last name, first name, date of birth, zip code} while the second data set may organize data as {Medicaid ID, address, zip code, date of birth, first name, last name}. As such, the records may not easily be combined.

Databases 130A-130B may comprise a non-transitory data storage system, although variations are possible. Database 130A-130B may each comprise any storage media readable by processing circuitry and capable of storing software. Database 130A-130B may include volatile and nonvolatile, removable and non-removable media implemented in any method or technology for storage of information, such as computer readable instructions, data structures, program modules, or other data. Database 130A-130B may include non-volatile storage media, such as solid-state storage media, flash memory, phase change memory, magnetic memory. Database 130A-130B may each be implemented as a single storage device but may also be implemented across multiple storage devices, cloud devices, or sub-systems. Database 130A-130B may each comprise additional elements, such as controllers, capable of communicating with processing circuitry.

Electronic device 140 is representative of any computing system or systems with which the various operational architectures, processes, scenarios, and sequences disclosed herein for a data processing management system may be implemented. Electronic device 140 is an example of, but are not limited to, server computers, rack servers, web servers, cloud computing platforms, and data center equipment, as well as any other type of physical or virtual server machine, container, and any variation or combination thereof. Further examples may include smart phones, laptop computers, tablet computers, desktop computers, hybrid computers, gaming machines, virtual reality devices, smart televisions, smart watches and other wearable devices, as well as any variation or combination thereof.

Electronic device 140 (such as a mobile phone, tablet computer, mobile media device, wearable computing device, etc.) can allow a user to make use of the various services and features of linkage platform 150. Electronic device 140 may include network communication components that enable the mobile devices to communicate with remote servers, databases, or other portable electronic devices by transmitting and receiving wireless signals using licensed, semi-licensed or unlicensed spectrum over a communications network. In some embodiments, electronic device 140 may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN.

An administrator or user of the electronic device 140 may request that either records 120A or 120B be evaluated and linked by submitting a request to linkage platform 150. Linkage platform 150 may determine the records that should be linked. Linkage platform 150 can use networks 160A-160B to receive records 120A-120B, respectively. Networks 160A-160B may be the same network. In some cases, a communication network 160A-160B may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 160 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Network 160A-160B have communication links between elements of communication system 100 may each use metal, glass, optical, air, space, or some other material as the transport media. These communication links may each use various communication protocols, such as wireless communications, cellular communications, IEEE 802.11 (Wi-Fi), Long Term Evolution (LTE), Time Division Multiplex (TDM), asynchronous transfer mode (ATM), Internet Protocol (IP), Ethernet, synchronous optical networking (SONET), hybrid fiber-coax (HFC), circuit-switched, communication signaling, or some other communication format, including combinations, improvements, or variations thereof. Communication links may each be a direct link or may include intermediate networks, systems, or devices, and may include a logical network link transported over multiple physical links.

Although only one link for is shown in FIG. 1 between particular elements, it should be understood that this is merely illustrative to show communication modes or access pathways. In other examples, further links may exist, with portions of the further links shared and used for different communication sessions or different content types, among other configurations. Communication links may each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Suppose two data sites 110A, 110B each hold a separate piece of private data which they would each benefit from jointly analyzing. For example, the parties may be administrators of hospitals or government agencies, who are bound by law to not disclose the information of individuals in their databases. Nevertheless, they may wish to join their data to that of some medical research center or another agency in order to perform a statistical model to the union of their data. As an example, to identify shared patients between two healthcare institutions 110A-110B, a family of methods called record linkage methods may be used. The most straightforward record linkage method can link patients using a unique identifier such as social security number (SSN) or medical record number (MRN). However, such unique and commonly shared identifier is often unavailable or unreliable, especially among pediatrics patients. Other identifiers, also referred to as linkage variables, such as first name (FN), last name (FN), date of birth (DOB) or address are often used to link records. The comparison between values of the linkage variables of two records determines their linkage. In accordance with various embodiments, the comparison can be further classified into exact comparison, or deterministic record linkage, and approximate comparison, or probabilistic record linkage. The methods to link records based on hash values can be referred to as privacy preserving record linkage (PPRL) methods.

Some embodiments can use probabilistic linkage methods to determine the likelihood that two records refer to the same person. The most widely used probabilistic record linkage method is the Fellegi-Sunter (FS) method which uses conditional probabilities to estimate match and nonmatch numeric scores for each value of a linkage variable. Based on these scores, a normalized summation weight can be assigned to each linkage variable indicating its significance in contributing to an overall similarity score. The similarity between the values of two linkage variables in each pair of records is called distance. For clear-text values, distance is usually measured by one of many available edit distance methods (e.g., Levenshtein distance). The overall similarity score between two records is computed as the weighted sum of the distances of all linkage variables. For hash values, distance is usually estimated based on number of overlapping hashed consecutive letters (e.g., q-gram) generated from the original clear-text values.

Various embodiments may use methods for distance computation for hash data such as Bloom Filter with Dice coefficient. A Bloom filter is a data structure for checking set membership. The basic steps are: 1) tokenize the value of a linkage variable into q-gram tokens, 2) hash the tokens with a family of hash functions and map the resulting hash values to a Bloom filter bit vector, and 3) based on the strings of binary values in two Bloom filter bit vectors, compute the approximate similarity via a set membership computation. The Dice Coefficient is the most common similarity score used to compare two Bloom Filters. Linkage variables may be either individual values (e.g., first name, last name) or a combination of multiple value. Along with an effective blocking scheme, the Bloom filter linkage method has been proven to be a scalable solution for probabilistic PPRL.

In accordance with various embodiments, linkage platform 150 may perform both clear-text and/or privacy-preserving record linkage operations including linkage job configuration and management, data standardization, data encryption and hashing, data linkage, data deduplication, and linked data dissemination. A clear text or non-obfuscated data may allow for a public use file that would allow others to analyze the integrated data. A privacy preserving record linkage may be used as an intermediate step in performing a computation on the integrated data. Some embodiments support both two-party and centralized record linkage via a trusted third party and a keymaster to generate and manage hash keys. In some embodiments, various components may take advantage of a modular software architecture which allows each module in the system to be updated, added or removed without the need to change the source code of the core framework.

Various embodiments of the present technology support a centralized linkage configuration mechanism and dynamic software update management. Some embodiments, may match results based on the calculated similarity between two linking fields' values and a set of weights which determines the relative contribution of each linking field's similarity or dissimilarity to a final match score. A number of methods for calculating distance measures that have different properties or optimizations for specific data types may be used to calculate similarity scores.

Figure 2:
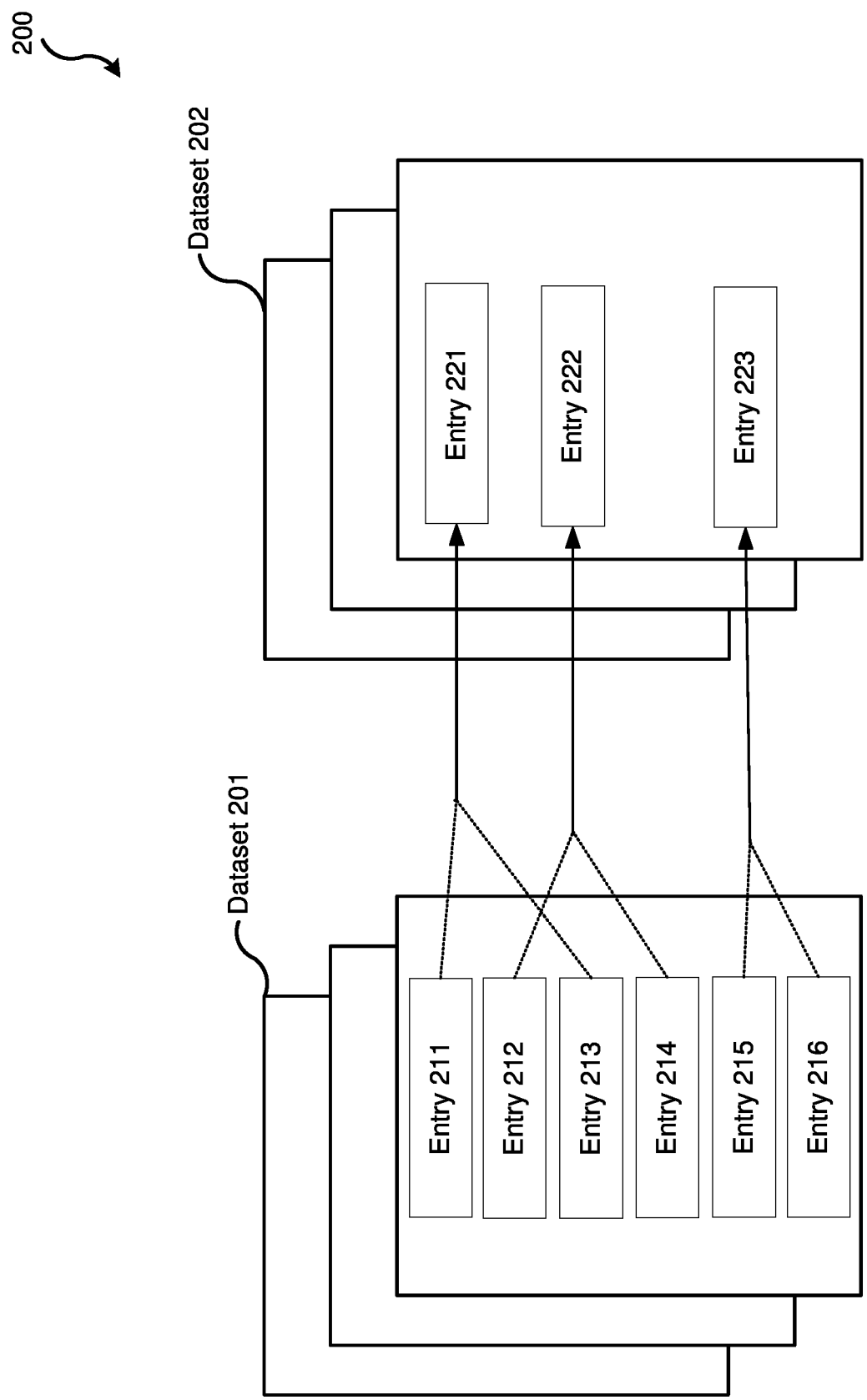
FIG. 2 illustrates an example of an objective of a record linkage platform according to one or more embodiments of the present technology.

With reference to FIG. 2, an example of an objective 200 of a record linkage platform 150 according to one or more embodiments of the present technology. In various embodiments, the record linkage framework 150 may have the objective to de-duplicate records, as wells as, link records about the same individual within different data sets. Duplicate records may be created for a number of reasons, including but not limited to new records created even when another record already exists for the same patient, merging of old and new systems, and the like. Some embodiments of the present technology use various techniques to deduplicate these repeated entries as well as link data across different data sets.

In some embodiments, linkage platform 150 may use one or more nonunique fields, called quasi-identifiers, to link two records belonging to the same individual. Quasi-identifiers are defined as fields that, when combined, may be able to uniquely identify an individual, such as date of birth and last name. In medical settings, missing data, including quasi-identifiers, may occur due to multiple reasons, creating challenges for record linkage. For instance, patients may not provide required information or clinical workflows may not ensure complete and accurate data collection and documentation. Linkage platform 150 may combine independent data sources 110A-110B, individually or in combination, into a dataset 202, and further combine the entries 211-216, such that the data 211-216 belonging to the same individual are assigned a common identifier. For example, in FIG. 2 it is determined by the linkage platform 150 that entries or electronic health data or documents or claim data 211 and 213 are the same individual, along with entries 212 and 214, and likewise with entries 215 and 216. These entries 211-216 are combined such that entries 211 and 213 of dataset 201 become entry 221 in dataset 202. Likewise, entries 212 and 214 become entry 222 in dataset 202 and entries 215 and 216 become entry 223 in dataset 202.

Figure 3:
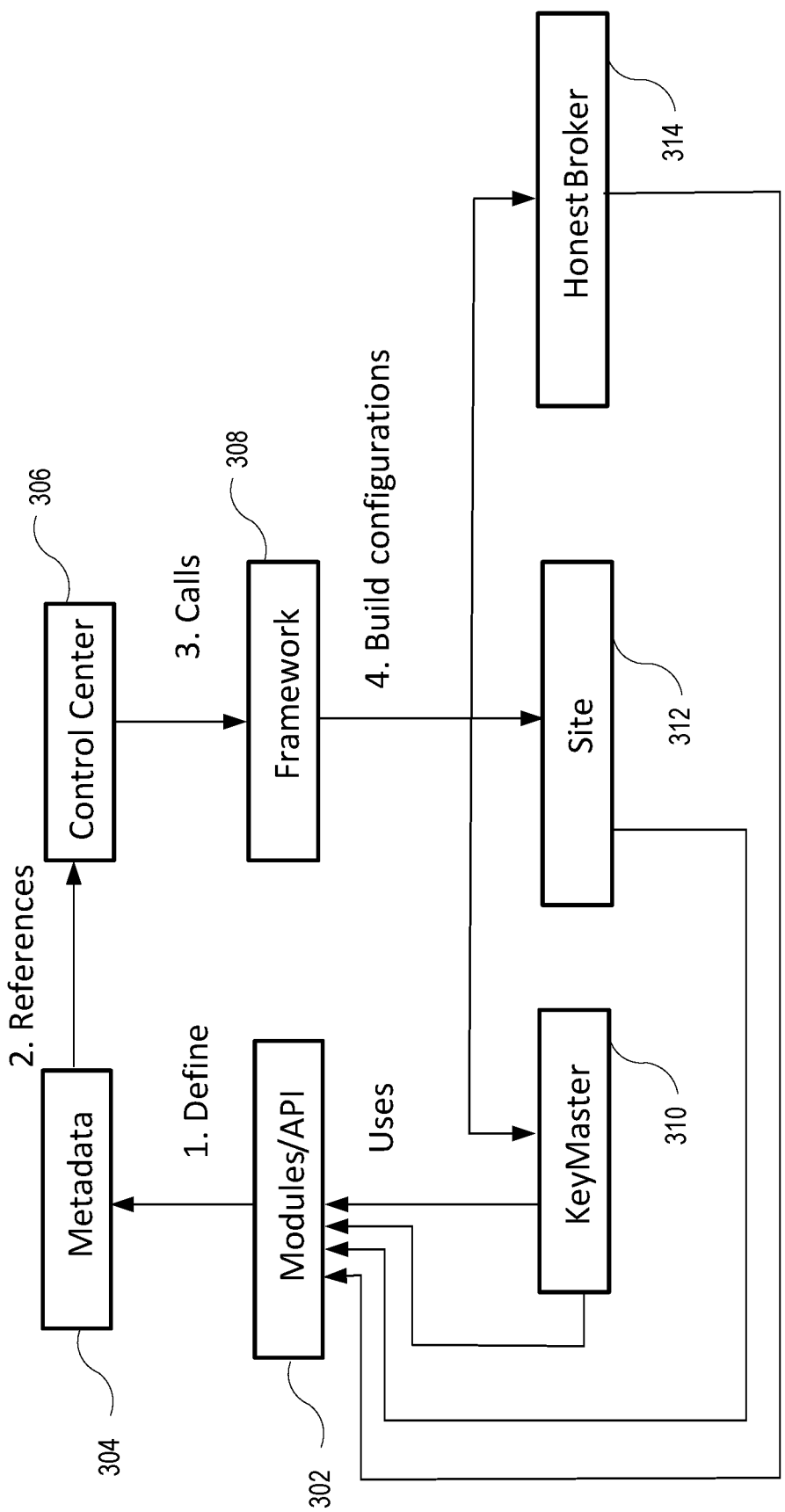
FIG. 3 illustrates messaging between components of a record linkage platform according to various embodiments of the present technology.

FIG. 3 illustrates messaging between various components of a record linkage platform according to various embodiments of the present technology. As illustrated in FIG. 3, various modules and application programming interfaces 302 can be used to define metadata 304. Metadata 304 provides an abstraction of the modules/API which can be referenced by control center 306 to create content on a website that defines various configurations (e.g., description of module classes). Control center 306 can be called by framework 308 to build various configurations which are sent to the various parties such as keymaster 310, sites, 312, and honest broker 314. For example, in some embodiments, these configuration files built by framework 308 can be customized for each linkage job and provide the orchestration or control for how these components will interact, create keys, hash data, normalize the data, and the like.

As such, FIG. 3 illustrates the orchestration of the components in a linkage platform or linkage systems. The modules/API 302 and Framework 308 are the core components of such system. A change (e.g., new functions or new parameters) in the modules/API 302 triggers changes in other components such as new content in the metadata 304, new web content in the Control Center 306. Because the keymaster 310, Site 312 and honest broker 314 use the underlying code in the module/API 302, their functionalities are bounded by the functionalities defined in the modules/API 302. The operations of the keymaster 310, site 312 and honest broker 314 are instructed by configuration files generated by the control center 306 using the framework 308.

Figure 4:
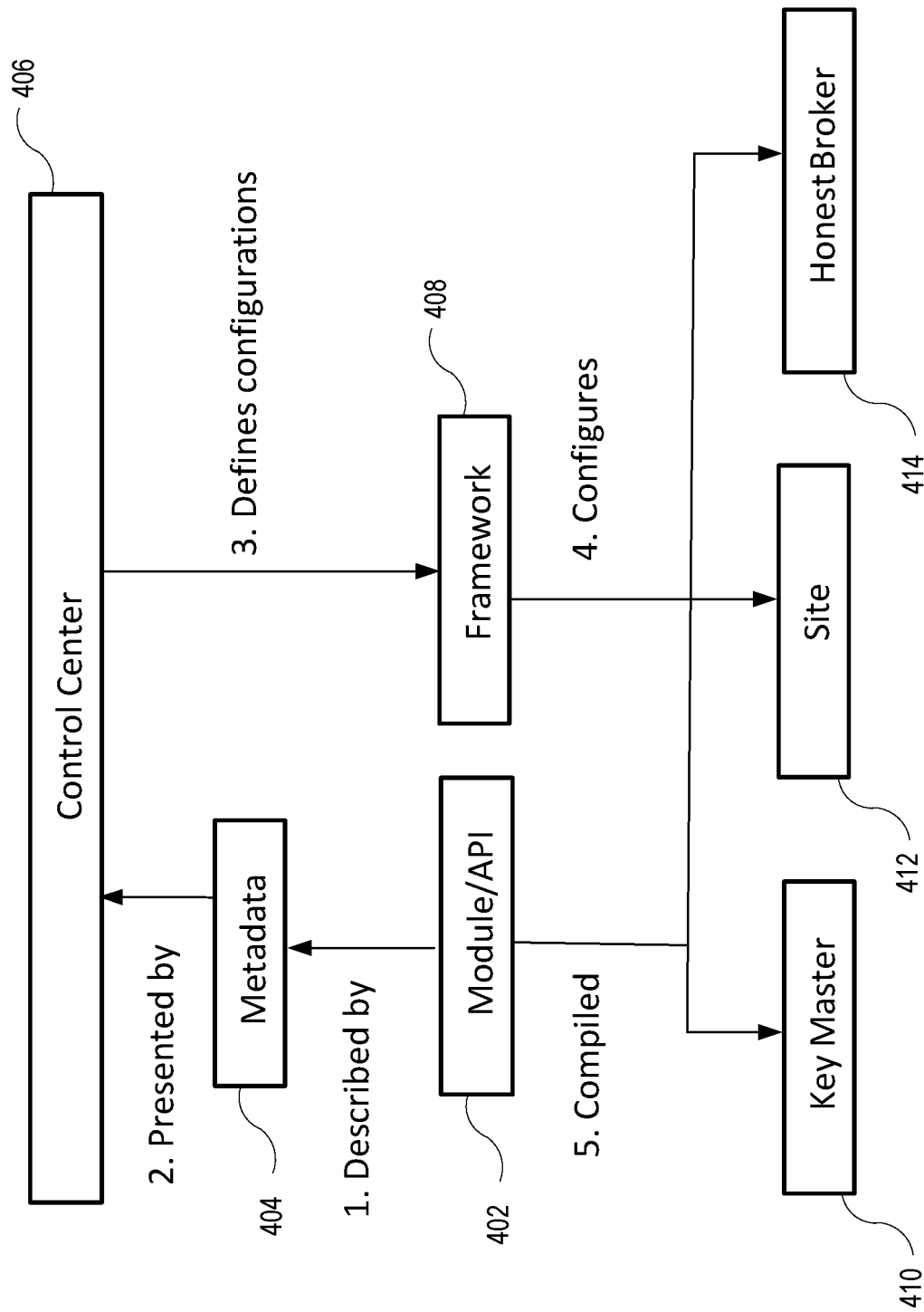
FIG. 4 illustrates the code dependency of a record linkage platform that may be used in some embodiments of the present technology.

FIG. 4 illustrates code dependency among components within a record linkage platform that may be used in some embodiments of the present technology. Modules 402 are described by the metadata (e.g., describing Java Classes) defined by the modules 402 and thereby provides an abstraction of the modules/API 402 which can be referenced by control center 406 to create content on a website that defines various configurations (e.g., description of module classes). A job creator can access the various configuration options via control center 406 and create a desired linkage job. The selections by the user can be used to define configurations by framework 408 which are used to build various configure various components such as keymaster 410, sites 412, and honest broker 414.

In some embodiments, the internal codes and files in the modules/API 402 can be used to compile the keymaster 410, site 412 and honest broker 414 applications. The content of configurations generated by the control center 306 can be built upon availability, structure and semantics defined in the Modules/API 402 and described by the Metadata 404. In some embodiments, the modules/API 402 is modular in a way that external programming code library or code files can be incorporated into the existing codes without the need to modify the existing codes. The external libraries and code files can be then referenced by the metadata 404 and presented on the control center 406 webpage.

As illustrated in embodiment shown in FIG. 4, the components in a linkage platform or linkage systems can be separated into three tiers: Tier 1 is the code base of the system which includes the Modules/API 402 and Framework 408. Tier 2 is the metadata of the codes in Modules/API 402 which include the Metadata 404. Tier 3 is the presentation of the codes described in the metadata. Tier 3 includes the Control Center 406, the KeyMaster 410, the Site 412 and the Honest Broker 414. All functionalities are defined in the Modules/API 402 and Framework 408. The content and operations of the components of presentation tier are orchestrated by the metadata and the configurations.

Figure 5:
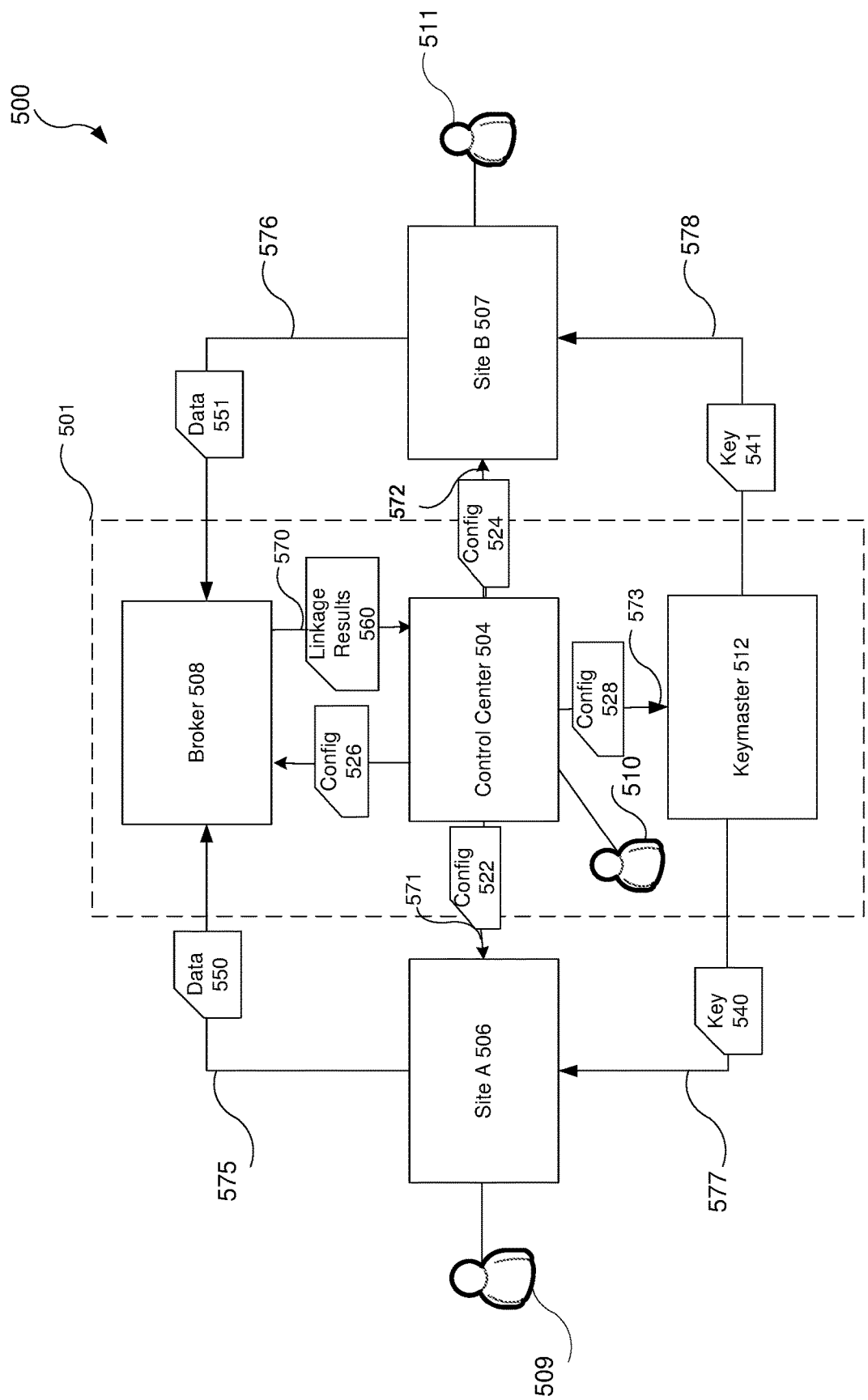
FIG. 5 illustrates a set of components of a system for linking data according to one or more embodiments of the present technology.

FIG. 5 illustrates a set of components of a linkage platform or linkage system 500 for linking data according to one or more embodiments of the present technology. As illustrated in FIG. 5, record linkage system 500 provides a framework to perform record linkage operations including linkage configuration and management, data standardization, data encryption and hashing, data linkage, data de-duplication, and linked data dissemination. Record linkage system 500 may support both centralized and distributed record linkage. In accordance with some embodiments, record linkage system 500 may implement modular software architecture which allows each module in system 500 to be updated, added or removed without the need to change the source code of the core framework. Some embodiments of record linkage system 500 can support a centralized linkage configuration mechanism and dynamic software update management. Record linkage system 500 may also include the following: data sites or entities 506, 507 and their administration users 509, 511, a linkage platform 501 including a control center 504, a broker 508, a user 510 and a keymaster 512. These components may be logically and/or physically different.

In accordance with various embodiments, control center 504 communicates with the data sites or entities 506, 507, the broker 508, and the keymaster 512 via communication links 570-573. The data sites 506, 507 may not be in direct communication with one another. The broker 508 can communicates with data sites 506, 507 via communication links 575, 576. The keymaster 512 can communicate with data sites 506, 507 via communication links 577, 578.

The control center 504, data sites 506, 507, the broker 508, the keymaster 512 may represent a plurality of special purpose computer systems or servers (e.g., distributed or cloud based). Each of the computer systems may include one or more data storage systems which may store data entries or records. The special purpose computer systems being programmed with software and/or firmware, or as a combination of special-purpose and programmable circuitry. Hence, embodiments may include a machine-readable medium having stored thereon instructions which may be used to program a special purpose computer (or other electronic devices) to perform a process.

The control center 504 may include special purpose software. Software being an application which performs multiple tasks or processes at the instruction of a processor. Examples of software may be an application, Java-based applications, and/or cloud-based web applications, and the like. In some embodiments, web applications may operate within a web browser on a user device (e.g., 140).

Figure 6:
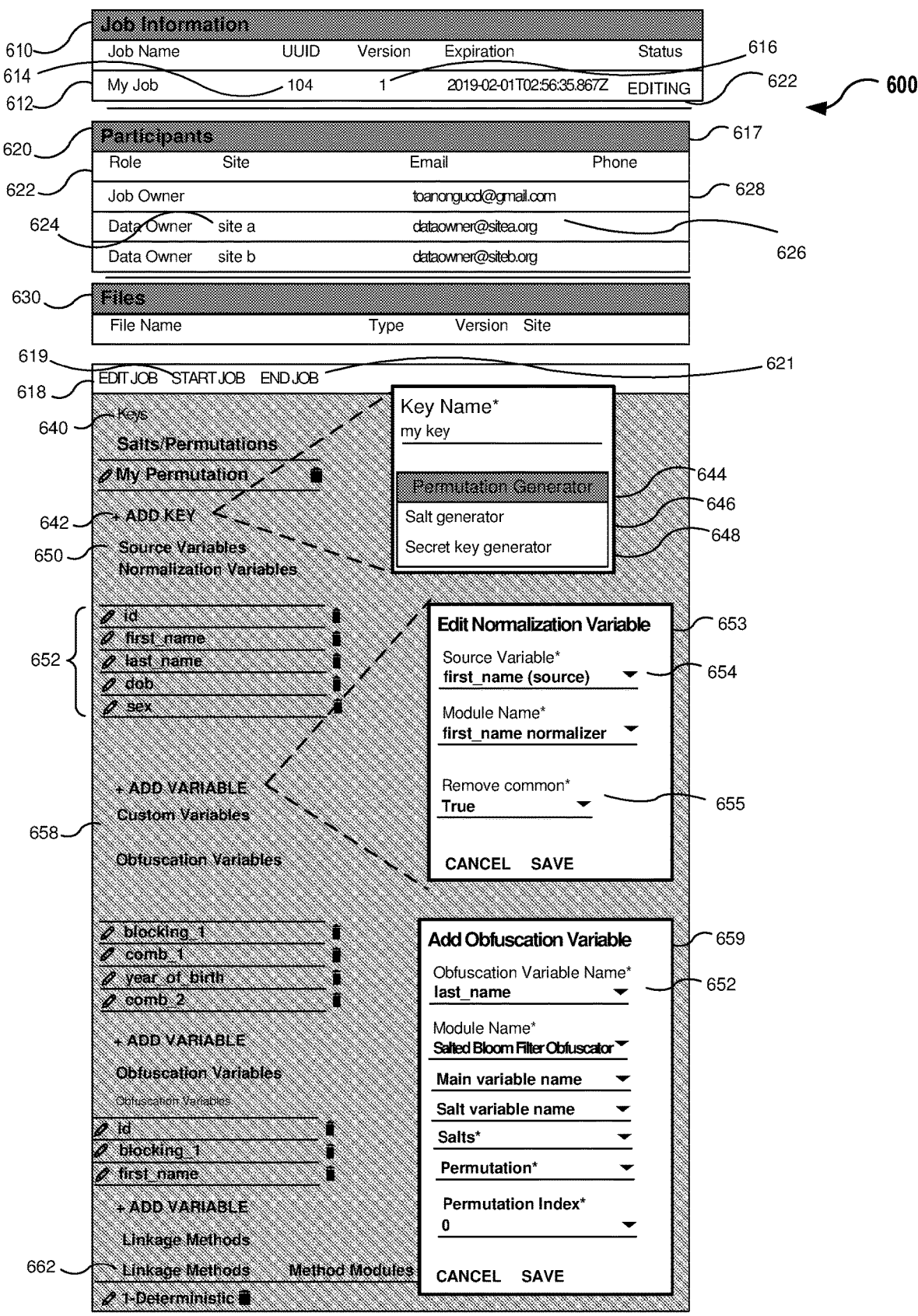
FIG. 6 illustrates an embodiment of graphical user interface that may be used within a control center according to one or more embodiments of the present technology.

The control center may be a web application wherein all of the software modules of the control center may be performed (e.g., a job management webpage). With reference to FIG. 6, a user job management web application 600 is shown. The web application 600 may be Java based, Spring-boot JavaScript, React, Angular 2 or the like and running a database such as PostgreSQL on Google Cloud DB on a Google AppEngine or Docker container. The web application may or may not have security, such as Google email account authentication (e.g., if the login is based on a Google account holder). The web application or web page or website or dashboard or project summary page 600 may look different depending on the user's privileges. FIG. 6 is shown from the control center's job owner's or user's 510 perspective. The web application 600 includes a job information portion 610; a participant portion 620; a files portion 630; a keys portion 640; and a source variable portion 650.

Figure 7:
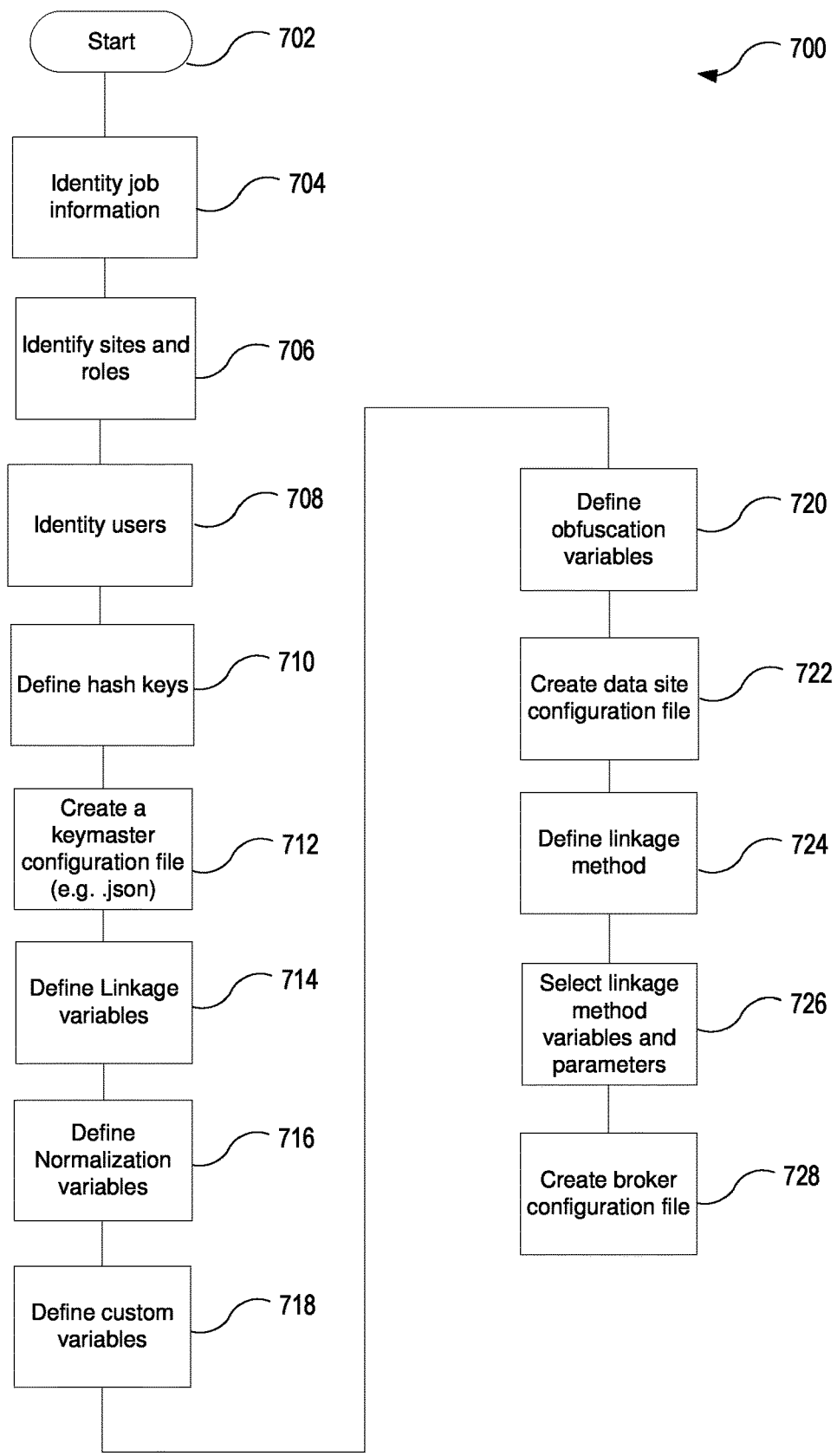
FIG. 7 illustrates a method for linking data according to one or more embodiments of the present technology.

With reference to FIG. 7, a method 700 for generating configuration files for participating members of a record linkage process is shown. On the job information 610 portion of the web application 600, there are the following modules: job name 612; job identification 614; software version 616; job expiration 617; job edit 618; job initiation 619; job termination 621; and job status 622. A module may be a process which uses a particular method to perform a function. For example, data hashing is a function which may have two modules: 1) SHA 1 module and SHA 2 module. A function may be an ability of a software to perform a specific task in a process. For example, data loading is a function to support the data standardization and hashing functions.

Each linkage job 612 can have a universally unique identifier (UUID) 614 and version number for the job software being used 616. Each job 612 can have an expiration 618 (e.g., date/time). For example, an expired job cannot be started. A warning may issue if the expiration is within a predetermined set time frame away. The job owner (e.g., 310 in FIG. 3) may identify and choose to edit any of the modules through the edit job module 619 (e.g., expiration date, name, participants, job site, job site's assigned role, etc.) (504). The job owner may start the job with the job initiation module 620 and may terminate a job with the job termination module 621 (502). A job 612 can only be started once the job 612 has been setup, otherwise an error may occur, as will be explained further below. The status of the job is monitored by the job status module 622. The status of a job may be, as an example: pending, completed, or started.

The next portion below the job information portion 610 is a participant's portion 620. A participant can be a user with a role (e.g., Data owner, keymaster). The participants have a role 622, a site 624, a correspondence address 626 (e.g., email), and phone number portion 628 (706). Participants are assigned roles by the user who creates a linkage job, a broker whom executes linkage processing against data sets provided by data sites (e.g., data owners) and exports linkage results to appropriate parties; a keymaster whom generates, manages, and provides hashing keys to data sites; and a data site whom prepares data set for linkage through source extract, load, pre-processing, profiling, and encryption/hash (508). A data site (e.g., 506, 507 in FIG. 5) may also be a job manager's role, but a broker 308 can never be the same as the keymaster (e.g., 512 in FIG. 5).

The web application 600 may also include a files portion 630. The files portion 630 would allow participants to share files amongst each other. The files portion 630 may also be where the participant specific configuration file (e.g., 522, 524 in FIG. 5) may be located for the participant to download as will be further discussed below. Other examples may include: documentation; user guides; deployment guides; and technical guides.

The key portion 640 provides a hashing key in keyed-hash message authentication (H MAC) that can be generated by a key generation module 642 (510). The key generation module 642 may be Java classes or applications defined in the web application 600, such as permutation generator 644, salt generator 646, or a secret key generator 648. HMAC is a specific type of message authentication code (MAC) involving a cryptographic hash function and a secret cryptographic key. It may be used to simultaneously verify both the data integrity and the authentication of a message, as with any MAC. Any cryptographic hash function, such as MD5 or SHA-2, may be used in the calculation of an HMAC. Permutation generator is a type of encryption that applies a key permutation to a message to produce some cipher. Likewise, a salt generator adds random data that is used as an additional input to a one-way function that "hashes" data, a password or passphrase. Hashing allows for later authentication without keeping and therefore risking the plaintext data in the event that the authentication is compromised. Key generation module 642 could also be used to encrypt and decrypt whatever data is being encrypted/decrypted.

The key generation module 642 enables data managers (e.g., 509, 511 at site A 507 and site B 509 in FIG. 5) to encrypt or hash the confidential data with Bloom filters or HMAC's. The secret key may be generated as described above and used to generate project-specific hash functions. Encrypted string variables like names are stored as hex coded strings. Four bits of the Bloom filter are translated into one character representing a hex coded number 0 to F to reduce the amount of data. Activation of the key generation module 642 may bring up a window 643 that allows a user selection of the type of key generation method (e.g., salt generator 646). A keymaster configuration file may be created once selection has been made (712).

The source variable portion 650 of the web application 600 allows the selection of both variables 652, as well as, how those variables will be handled (714). Variables 652 may include, but not limited to: full name, middle name, prefix, suffix, nick name, social security number (ssn), last four of ssn, mother's maiden name, vital status, date of death, identification number, first name, last name, date of birth, sex, address, phone number. Once the variables are selected that are to be reviewed for linkage, those variables must be normalized to be compared.

Activation of the source variable portion 650 may bring up a window 653 that allows a user to select a source variable and how it will be normalized (716). Some embodiments use a normalization process that is regulated by underlying metadata. For example, if first name 654 is the chosen variable to normalize, then prefixes, suffixes, and non-alpha characters are removed. Source variable must be normalized by one of the modules. Each normalization method may have a different set of parameters, such as "Remove common" 655, wherein a common input is replaced with an empty string. Another example of a parameter is "Multiple values" which indicates that a single variable can contain multiple possible values which are delimited by the "Splitter" string.

Activation of the source variable portion 650 may bring up a window for customization of the variable 652 (718). For example, a customization 658 may include extracting the three initial characters from the last name and concatenate first name and last name together. An example of a parameter of a customization module to extract the year number of a date is the format (e.g., dd-MM-yyyy) of the date. As another example, a customization module can encode a name using a phonetic encoding method such as SOUNDEX or New York State Identification and Intelligence System (NYSIIS).

Activation of the source variable portion 650 may bring up a window 659 for obfuscation of the selected variables 652 according to the selected key from the key generation module 642 (720). A user may also be able to select a hashing method. Once selected, a data site (e.g., 506, 507 in FIG. 5) configuration file may be generated (722).

Activation of the source variable portion 650 may also allow for selection of type of record linkage method 662 after the linkage variables are prepared (726). In this case, record linkage may be deterministic or probabilistic. There may also be an election of how many rounds should be completed. The control center may also allow for custom methods to be downloaded without affect source code of control center 504, keymaster 512, honest broker 508, and sites 506, 507. A threshold to determine if a match score of a pair of records is qualified to be assigned a match for a probabilistic linking method.

Once all elections are made, a broker configuration file may be generated (728). The job may be initiated by the job initiation module 619. Control Center (e.g., 504 in FIG. 5) may generate the configuration files (e.g., 522, 524, 526, 528 in FIG. 5) by means of a linkage configuration module for each of the different participants that will negotiate how their data should be modelled based on the elections made (e.g., how keymaster determines key). The configuration files 522, 524, 526, 528 (e.g., flat file format) in the files portion 630 may only be visible to the specific participants. For example, a *site.json file is only accessible to the participants who are a data site (e.g., 506, 507 in FIG. 5).

The job initiation module 619 may issue warnings if there are: not enough participants (e.g., at least one: data site 506, 507; broker 508; and keymaster 512 in FIG. 5); not enough source variables or if source variable is not referenced in the selected normalization, obfuscation, customization modules; no selected linkage method; and not selected match score or type for a probabilistic linkage method. The control center web application 600 may further include alternative software modules.

Users 510 may register with the web application 600 with a user registration module as a specific role, e.g., a data site 506, keymaster 512, broker 508. The registration module may require a password for login, and a password management module may allow a user to change a password. A communication module may allow for users (once registered) to communicate with each other through an in-app messaging or email. A participation invitation module sends out an invitation through email to become part of the record linking.

A data blocking module may be used in some embodiments to block or remove heterogeneity when the sizes of the data files to be linked are moderate to large (e.g., tens of thousands of records or more). If applying the above configuration may be too inefficient or time consuming, then blocking is a way to deal with this problem. For example, a reliable" field such as zip code or gender may be used to quickly label some of the non-links.

Other software module examples may be: how the linked data should be deleted; how the progress should be reported; issue tracking; network communication failure between participants and control center tracking; and a support module for trouble shooting.

Referring back to FIG. 5, with the data sites 506, 507. Each of the data sites 506, 507 being special purpose computer systems programmed with software and/or firmware, or as a combination of special-purpose and programmable circuitry at the control of users or data owners 509, 511. Hence, embodiments may include a machine-readable medium having stored thereon instructions which may be used to program a special purpose computer (or other electronic devices) to perform a process. Data site 506, 507 may be a web-application which runs on special purpose hardware with or without Internet connection. The data site web application may be hosted on local server behind a data owner's security firewall or a sub-part of the web application of the control center. The main functions of a data site 506, 507 include: configuration file extraction, data loading, data transforming (data standardization, data normalization, data customization, data obfuscation), linkage data generation, data profiling, data encryption/hashing and data exporting.

The data site 506, 507 loads the linkage configuration file as described above either received from the control center 504 or downloaded from the web application 600. It may be that all data pulls/pushes related to the data site 506, 507 must be initiated by the data sites 506, 507 themselves. It should be noted that the data sites 506, 507 can handle more than one job at a time.

Figure 8:
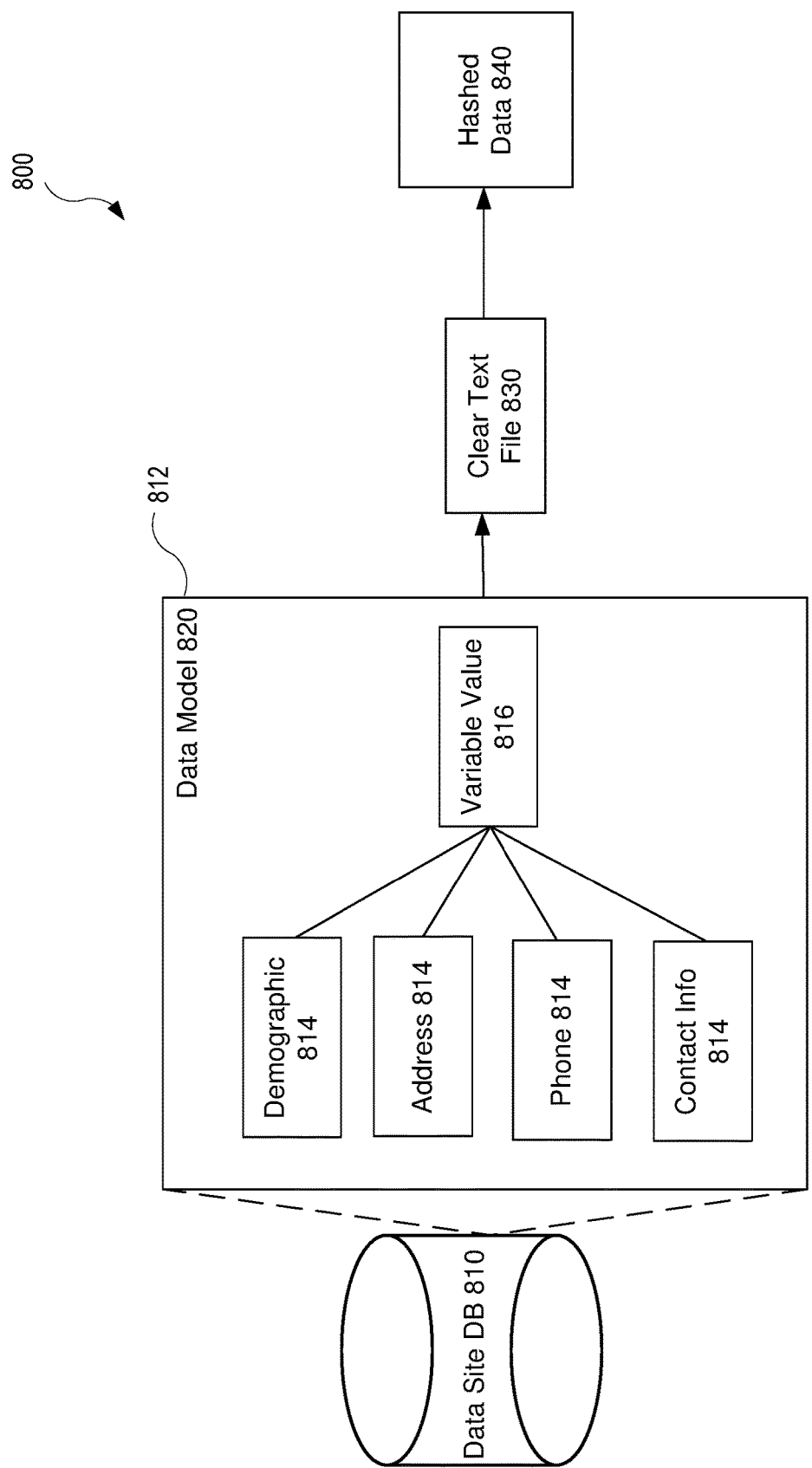
FIG. 8 is block diagram illustrating generation of a hashed personal health identifier entry in accordance with one or more embodiments of the present technology.

With respect to FIG. 8, a block diagram 800 illustrates the generation of a hashed personal health identifier entry in accordance with one or more embodiments of the present technology. Data site (e.g., 506, 507 in FIG. 5) can have a database source 810 with data 812 (e.g., protected health information (PHI)) that may be pre-processed to place the data into a standard format using a data model 820. The data model 820 may specify an order set of fields 814 that the source data should be formatted into, for example, a variable value 816. The data model 820 may be configured by the configuration file (e.g., 522, 524 in FIG. 5) from the control center (e.g., 504 in FIG. 5). The fields 814 contained in data 812 may ultimately be used as part of the linkage process to identify records that should be linked. Some examples of linkage variables include, but are not limited to, first name, last name, date of birth, social security number, gender, zip code, demographic, address, phone, contact information, and the like.

In other embodiments, data model 820 may be automatically selected based on the type of data (e.g., financial, health, educational, etc.) being processed. Once the pre-processing is complete, a clear text file 830 may be generated (e.g., comma separated value (CSV) file). The data site (e.g., 506, 507 in FIG. 5) may then normalize, customize, profile, de-duplicate, obfuscate, and hash the pre-processed data to generate a hashed file 840 (e.g., data 550, 551 in FIG. 5) that is transmitted to the broker (e.g., 508 in FIG. 5).

One method of data hashing may be hashing the standardized clear-text value of a linkage and mapping the value into the Bloom filter data structures. There are two options for the standardized clear-text value: 1) single-field and 2) combination of multiple fields. Single-field clear-text value is the value of a single linkage variable. For example, "John" in the First name variable. Multi-field combinations are the result of the concatenation of more than one linkage variable. For example, if the text value is the concatenation of three variables: first name, last name and date of birth, a possible value of the text value is "johndoe1121080215".

To generate a Bloom filter from a clear-text value in a linkage variable may require the following steps: 1) tokenize clear-text values in to n-gram tokens (i.e., bi-gram, tri-gram). Note that clear-text value may be a text value from a single field or a combination of multiple fields as described above; 2) concatenate each token with a 64-bit random alphanumerical string (also referred to as hash key or random salt); 3) hash the concatenate string using a one-way hash function (e.g., SHA-2); 4) hash value is converted into an integer and represents a position in a Bloom filter (e.g., set the bit at that position in the Bloom filter to 1); 5) repeat step 2 and step 3 k times, each time with a different hash key. The value of k can be between 10 to 40, for example. The same token, hashed with different hash keys, might result in different position in the Bloom filter being set to 1. Step 6: Repeat step 2, 3, 4, and 5 for all tokens.

For example, assume that the clear-text value is "john" in linkage variable first name. The result of the tokenizing this value into bi-grams is: "jo", "oh", and "hn". Assume the random 10-letter hash key is "AjswrT120 W". Some embodiments may use a use 64-bit hash key in the tool. The output of the concatenation of token "jo" and the hash key will be: "joAjswrT120 W". The hash value of "joAjswrT120 W" using SHA-612 (a SHA-2 method) is a string that starts with "18DDF05041F4BD7124567D5FC1DE . . . ". The hash value is converted into an integer number based in the size of the Bloom filter. Assume that the size of the Bloom filter is 100 which is equivalent to a bit string with zero being the value of all of its bits. Assume that the resulted integer number is 54 which means that the 54th bit in the Bloom filter is set from 0 to 1. Repeat hashing the same token using a different hash key (from keymaster 512). Repeat step 2, 3, 4, and 5 for "oh" and "hn".

After the hashing sequence, transfer the hashed file 640 (with or without keyed hash data) to the broker (e.g., 508 in FIG. 5) may be by using one of the following methods:

secure file transfer protocol (sFTP), encrypted flash drive, encrypted email, and the like.

Data sites (e.g., 506, 507 in FIG. 5) may load keys (e.g., 540, 541 in FIG. 5. The keys (e.g., 540, 541 in FIG. 5) may be the same or different. The data site (e.g., 506, 507 in FIG. 5) can have the capability of communicating with the keymaster (e.g., 512 in FIG. 5) to transmit key (e.g., 540, 541 in FIG. 5) if not already transmitted. Prior to transmission to the broker (e.g., 508 in FIG. 5), the data site (e.g., 506, 507 in FIG. 5) may review the data to compare it with the standard definitions as defined in the configuration file (e.g., 522, 524 in FIG. 5). Or may review to make sure there are no clear text data, and everything is comma separated if that if format chosen. The hashed data (e.g., 550, 551 in FIG. 5) may also be encrypted by data sites (e.g., 506, 507 in FIG. 5) for verification and securely transferred. The data site (e.g., 506, 507 in FIG. 5) may communicate with broker (e.g., 508 prior to transmission for preparedness. The data sites (e.g., 506, 507 in FIG. 5) may give status updates manually or in real time to the control center. These may be as simple as green check marks. The data site (e.g., 506, 507 in FIG. 5) may change the file to a different format.

Other data site specific software module or functionalities examples may be: job deletion; data profiling, such as summary statistics as follows: number of unique values of a linkage variables; average count of each in a linkage variable; highest count for a value in a linkage variable; standard deviation of the count of all values in a linkage variable; and generate custom linkage variables based on raw linkage data. For example, by concatenating first name and last name, a new linkage variable called 'full name' may be generated.

Such functionalities and modules may be determined by the version of the software running at the data site (e.g., 506, 507 in FIG. 5). The data site (e.g., 506, 507 in FIG. 5) may validate current version of the linkage configurations from the control center (e.g., 504 in FIG. 5). If there are any discrepancies (e.g., an encryption method in the configuration file is not supported by the current version of data site 506, 507), determine the updates needed from control center (e.g., 504 in FIG. 5). Data site (e.g., 506, 507 in FIG. 5) may download an update or a new configuration from control center (e.g., 504 in FIG. 5) to update version. This can be validated the successfulness of the update. The data site (e.g., 506, 507 in FIG. 5) may also allow for the selection of the number of threads to be used for the job. With more processing cores (e.g., CPUs) available, more threads will increase the processing speed.

Referring back to FIG. 5, to the keymaster 512. The keymaster 512 being a special purpose computer system programmed with software and/or firmware, or as a combination of special-purpose and programmable circuitry at the control of users. Hence, embodiments may include a machine-readable medium having stored thereon instructions which may be used to program a special purpose computer (or other electronic devices) to perform a process. Keymaster 512 may be a web-application which runs on special purpose hardware with or without Internet connection. The keymaster web application may be hosted on local server behind a user's security firewall or a sub-part of the web application of the control center. The main functions of the keymaster 512 include: loading the linkage configurations 528 received from the control center 504; generate random key strings 540, 541 using the configurations; store generated random key strings 540, 541 into flat files along with the job identifier 614; Transfer key 540, 541 to sites who identify themselves as data sites 506, 507; and deny key requests from non-data sites (e.g., the broker 508).

Keymaster 512 loads control center configuration 528, which directs what salt or random hash text strings are to be generated at various lengths. Once keymaster 512 generates a hash key 540, 541, those keys can be stored in flat file. Keymaster 512 may periodically deprecate current saved keys at the expiration of a project. The keymaster 512 may also receive requests from data sites for keys 540, 541 and fulfill those requests. The keymaster 512 may give status updates manually or in real time to the control center. These may be as simple as green check marks. After the hashing sequence, the transfer from keymaster 512 to the data sites 506, 507 may be by using one of the following methods: secure file transfer protocol (sFTP), encrypted flash drive, encrypted email, and the like.

The broker 508 being a special purpose computer system programmed with software and/or firmware, or as a combination of special-purpose and programmable circuitry at the control of users. Hence, embodiments may include a machine-readable medium having stored thereon instructions which may be used to program a special purpose computer (or other electronic devices) to perform a process. Broker 508 may be a web-application which runs on special purpose hardware with or without Internet connection. The broker web application may be hosted on local server behind a user's security firewall or a sub-part of the web application of the control center. The main functions of the broker 508 include: 551 loading and linking integration into a single data set; save linkage in memory; linked data management (e.g., destroy linked data that has expired); and linked data 560 dissemination to the data sites 506, 507 or to the control center 508.

The broker 508 is an honest broker. In that, it is understood that the users of the broker 508 will follow the protocol. In the case where the users of a broker will try to covertly infer whatever they may from the data, then this is called the semi-honest" or "honest but curious" model. Using techniques from cryptography it is not theoretically possible to take any inference from the data without the hash key, which the broker 508 is never given access to. In any particular linkage job, the broker 508 may be forbidden from retrieving keys from the keymaster 512 or data sites of that same job in any circumstances. It should be noted that a particular site may one-time be a keymaster for one job and a broker for another, but the keys are unique for each individual job. The platform or protocol should reveal no more information as the private data 550, 551 are presented to a completely trusted third party (e.g., broker 508), who performs the computation and may return the results to each of the original parties. That is, to any specific party, the computation itself should reveal no more than whatever may be revealed by examining his input and output. The goal is to perform record linkage without revealing anything about the non-linked records. In some embodiments, the values of the match variables as well as the selected parameters or variables may be presented in a clear text view to the data sites 506, 507. As such, the data sites may see the configurations such as the variables, parameters, and the like.

To illustrate an example of a linking method or scoring technique using Jaccard Similarity, two strings A and B may be converted into sets SA and SB. Then, a similarity score, Sim, may be generated using the following formula:

$$Sim(A, B) = \frac{|S_A \cap S_B|}{|S_A \cup S_B|}$$

The value of Sim(A, B) indicate similarity between A and B. For example, John may be converted to bi-gram B={_J, Jo, oh, hn, n_} and Jhon may be converted to bi-gram B={_J, Jh, ho, on, n_}. Then, Sim(John, Jhon)=2/8=0.25. In some embodiments, a string similarity algorithm may be extended by converting the strings to Q-grams (Q>2). For example, John may be converted to tri-gram T={_Jo, Joh, ohn, hn_, n_h}. From T extension X may be created by dropping middle character giving X={_o, Jh, on, h_, nh}. Then, an extended bi-gram E={_J, Jo, oh, hn, n_, _o, Jh, on, h_, nh} may be created. Comparing extended bi-grams (instead of bi-grams) may be used to account for missing and flipped character. With the extended algorithm, Sim(John, Jhon)=0.75. A predetermined value will be set in this probabilistic linkage method for a similarity to be linked.

In another example, two records are linked if their match score is larger than a threshold (t). The similarity score of two records are computed by two different methods corresponding to the method which was used to hash the data. The normalized match score ranging from 0 to 100 (0: absolutely different, 100: exactly the same) of two records is computed using the following formula:

$$\text{Match\_score} = \sum_{i=1}^{f} w_i * d_i$$

Where: $d_i$ is the distance between the Bloom filters of variable i. $d_i$ may be computed by the calculating the Dice coefficient (DC) using the following formula $$DC = \frac{2|X \cap Y|}{|X| + |Y|}$$

With: $|X \cap Y|$: number of 1s in the same position in the two source Bloom filters.

$|X|$, $|Y|$: number of 1s in the Bloom filter X and Y respectively.

Broker 508 may also assign block identifiers to each record based on linkage configurations. Each record may have multiple block IDs depending on the number of blocking rounds. The broker 508 may perform blocking analysis, such as counting the number of records per block; compute max, min, average and standard deviation of block sizes; and generate all linkage pairs dataset based on different blocking schemes with the elimination of duplication pairs. For example, if two pairs of [A, B] and [B, A] are included, one may be removed.

Broker 508 may support multistage linkage. Multistage linkage uses a different linkage method during each stage. An example would be a multistage method which uses both deterministic linkage and probabilistic linkage. In this method, stage 1 may use deterministic linkage and stage 2 may use probabilistic linkage. On each stage, perform record linkage on the integrated dataset based on the linkage methods defined in the configurations. The broker 508 may then eliminate the linked record from the all linkage pairs dataset. The all linkage pairs dataset is the result of a cross-join (all possible pairs) between a two or more sets of records.

The broker 508 may perform an evaluation of the linkage data with a performance module. If the linkage data 560 (synthetic data, gold standard data) contains data to allow confirmation of the correct linkage (often determined via a shared identifier), linkage performance may be evaluated using the following metrics: number of matches; number of true positives; number of false positives; number of false negatives; precision; positive predicted value; and F1 measure.

The broker 508 may generate a globally unique identifier (GUID) or network wide identifier (NWI) for each linkage job and for each linked/non-linked record. Instead of the data 560, the GUIDs may be disseminated to the data sites 506, 507 based on the job configurations. The broker 508 may give status updates manually or in real time to the control center. These may be as simple as green check marks in the web application. After the linkage method, the results 560 may be transferred to the data sites 506, 507 or control center 504 on a secured portable data medium without disclosure of the encryption key by using one of the following methods: secure file transfer protocol (sFTP), encrypted flash drive, encrypted email, and the like. If the linked data (or an associated network wide identifiers) is encrypted, then it may be then transmitted back to the data sites 506, 507 that may use the key 540, 541 to decrypt the data for linkage.

Figure 9:
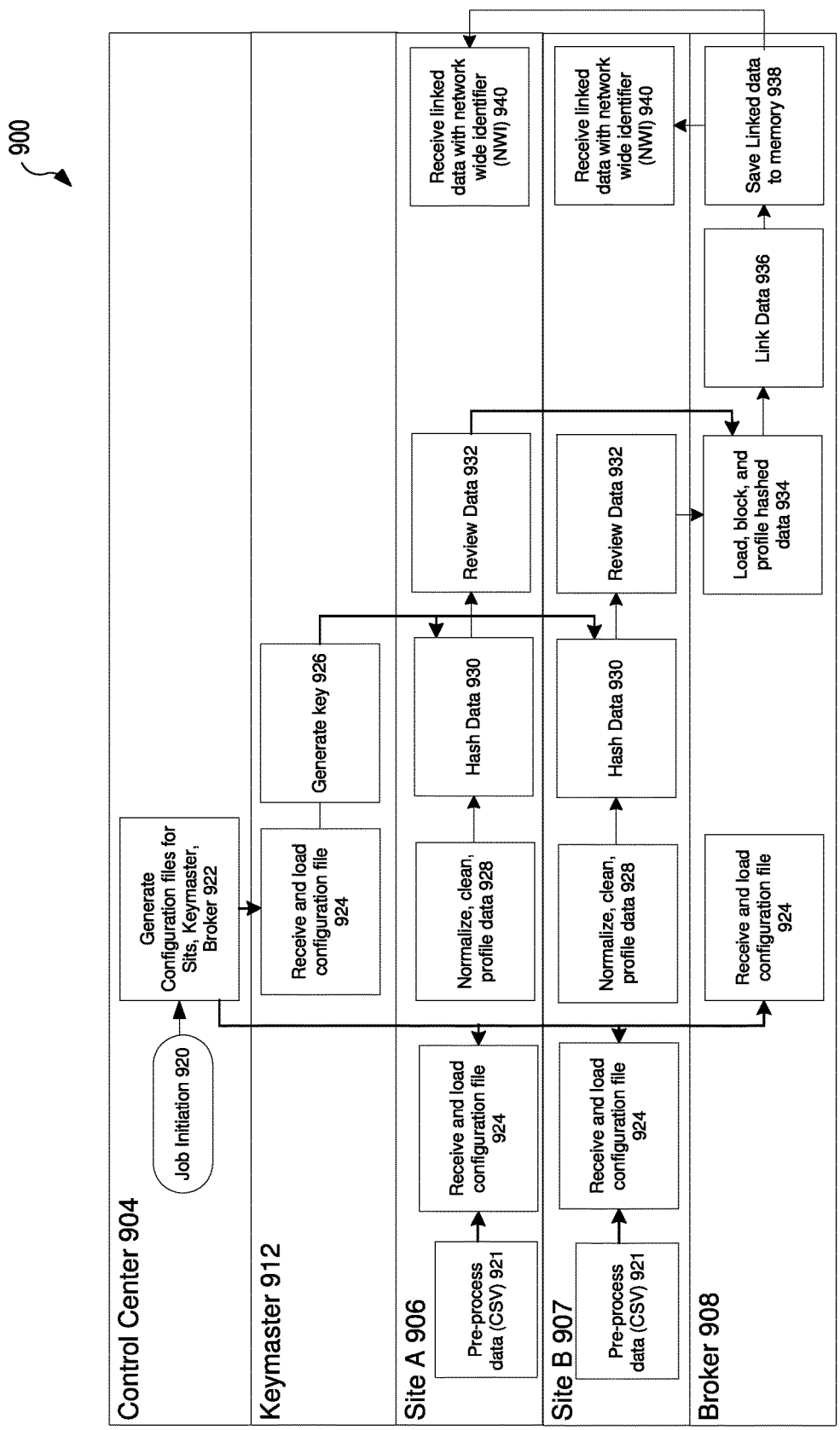
FIG. 9 is a flowchart illustrating a set of operations for linking records in accordance with some embodiments of the present technology.

FIG. 9 is a flowchart illustrating a set of operations for linking records in accordance with some embodiments of the present technology. As illustrated in FIG. 9, the system 900 may include a control center 904, a keymaster 912, multiple data sites 906, 907 (e.g., site A and site B), and the honest broker 908. A linkage process may be initiated at the control center (904). The data sites 906, 907 may preprocess (e.g., data cleansing, data normalization, data hashing, etc.) their data to a particular output, such as CSV (921). The control center 904 may create a set of configuration instructions controlling how the other components (data sites, keymaster, broker) operate (922). In accordance with some embodiments, the configuration instructions do not contain any personal information (e.g., personal health information). The keymaster 912 receives and loads the key generation configuration file (924) and generates a hash key that may be transmitted to the multiple sites (926).

Once each other site receives the corresponding configuration file, each data site 906, 907 loads the configuration file (924). The data sites 906, 907 may begin normalizing, clean, and profiling the data (928). Once the hash key is received, the pre-processed data may be hashed, and placed in a desired format (e.g., comma separated value format) before being transmitted to the honest broker (1030). The data is reviewed prior to being transmitted to the broker (932). Data sites 906, 907 may review the data to compare it with the standard definitions as defined in the configuration file 522, 524. Or may review to make sure there are no clear text data, and everything is comma separated if that if format chosen.

In accordance with various embodiments, the honest broker 908 receives and loads the configuration file specific to it (924). The broker 908 may load the hashed data and perform a linkage analysis to identify which data should be linked (934). Some embodiments may use various linkage techniques including deterministic techniques (e.g., using exact matching) or probabilistic (e.g., using a Bloom filter or Jaccard Similarity) (936). For example, a privacy preserving record linkage technique may use Bloom filters and similarity scores. Once the analysis is completed, the linked data is saved in the broker 908 memory (938). The linked data is transmitted back to the data sites 906, 1020 with a network wide identifier (1040).

Figure 10:
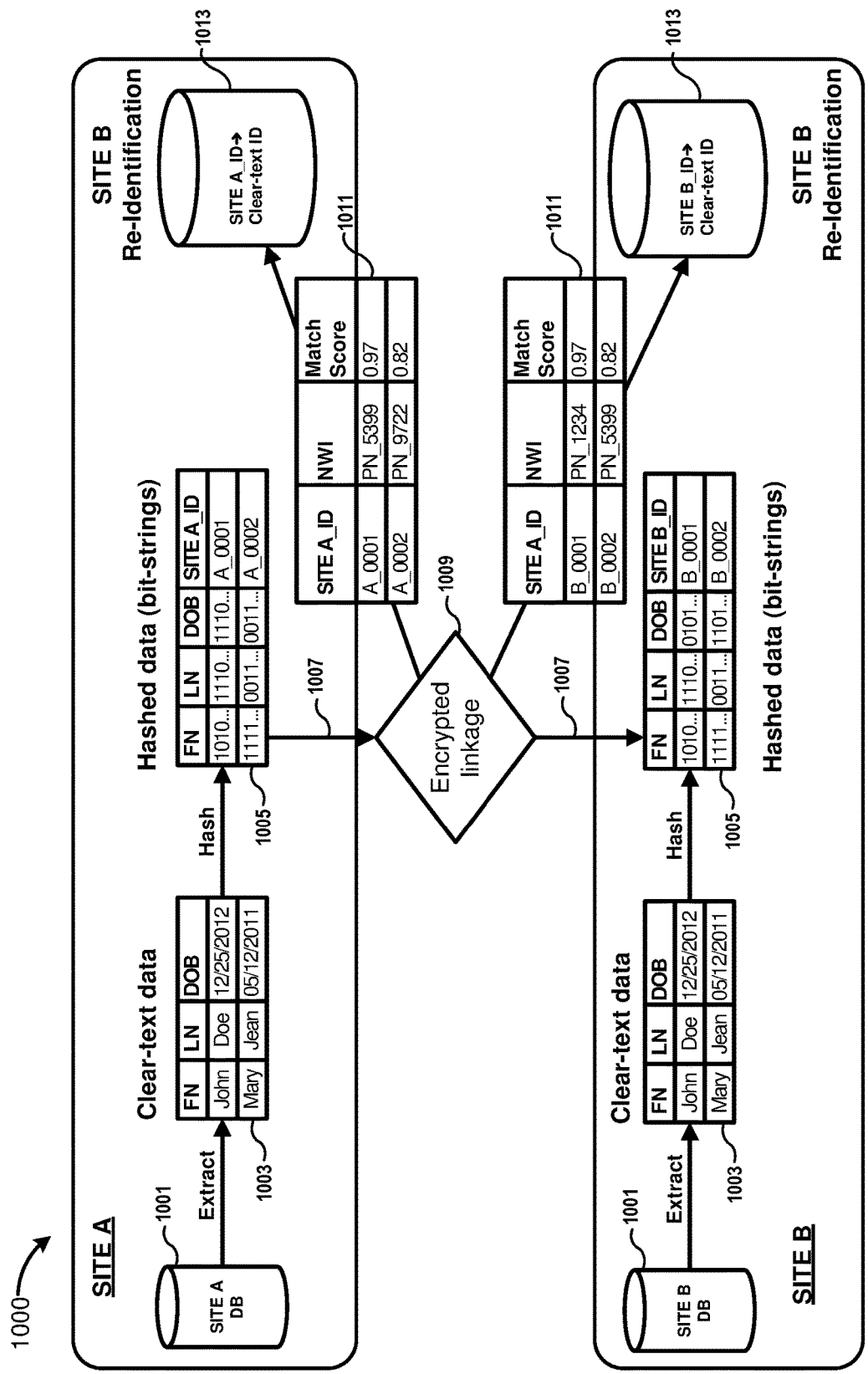
FIG. 10 is a flowchart illustrating a set of operations for linking records in accordance with some embodiments of the present technology.

With reference to FIG. 10, an example illustrating a set of operations 1000 for linking records in accordance with some embodiments of the present technology. In the example shown, a probabilistic PPRL record linkage method is utilized by implementing a tool in the honest broker. The overall process of this linkage process is as follows. SITE A and SITE B have databases with patient data 1001. From the list of all patients, SITE A and SITE B independently create a sub-dataset of potential patients based on two initial digits in zip code in their most recent address. To do this SITE A and SITE B will run a database script to perform a pre-process clear-text data standardization on name, date and address (1003). Data standardization process includes linkage value reformatting, special character removal, phonetic encoding, and missing data standardization. SITE A and SITE B will execute data hashing using a tool with a set of random hash keys generated only for this project by a keymaster (1005).

A university website will be the honest broker (HB) in this protocol. HB server is a secure HIPAA-compliant environment. SITE A and SITE B will transfer its hash values to the HB via a secure file transfer protocol (sFTP). Hash values of each record will be associated a random identifier called SITE_ID (1007). The HB will perform the data linkage (1009). If two records are linked, a universal network-wide identifier (NWI) will be assigned to both of them (1011). The results are sent to the sites (1013). A dataset with three columns, namely SITE A_ID, NWI and match_score will be sent back to SITE A. SITE A_ID is the original random identifier associated with the hash values from SITE A. NWI is the newly generated random ID resulted from matching the records. Even if a record is not linked to any records will be assigned with a NWI. Match_score represents the agreement between two records. Match_score may be used to determine which linkages to verify in the linkage verification step. Similar to SITE A, SITE B will receive their own random ID, NWI and match score for each linkage (1013).

Figure 11:
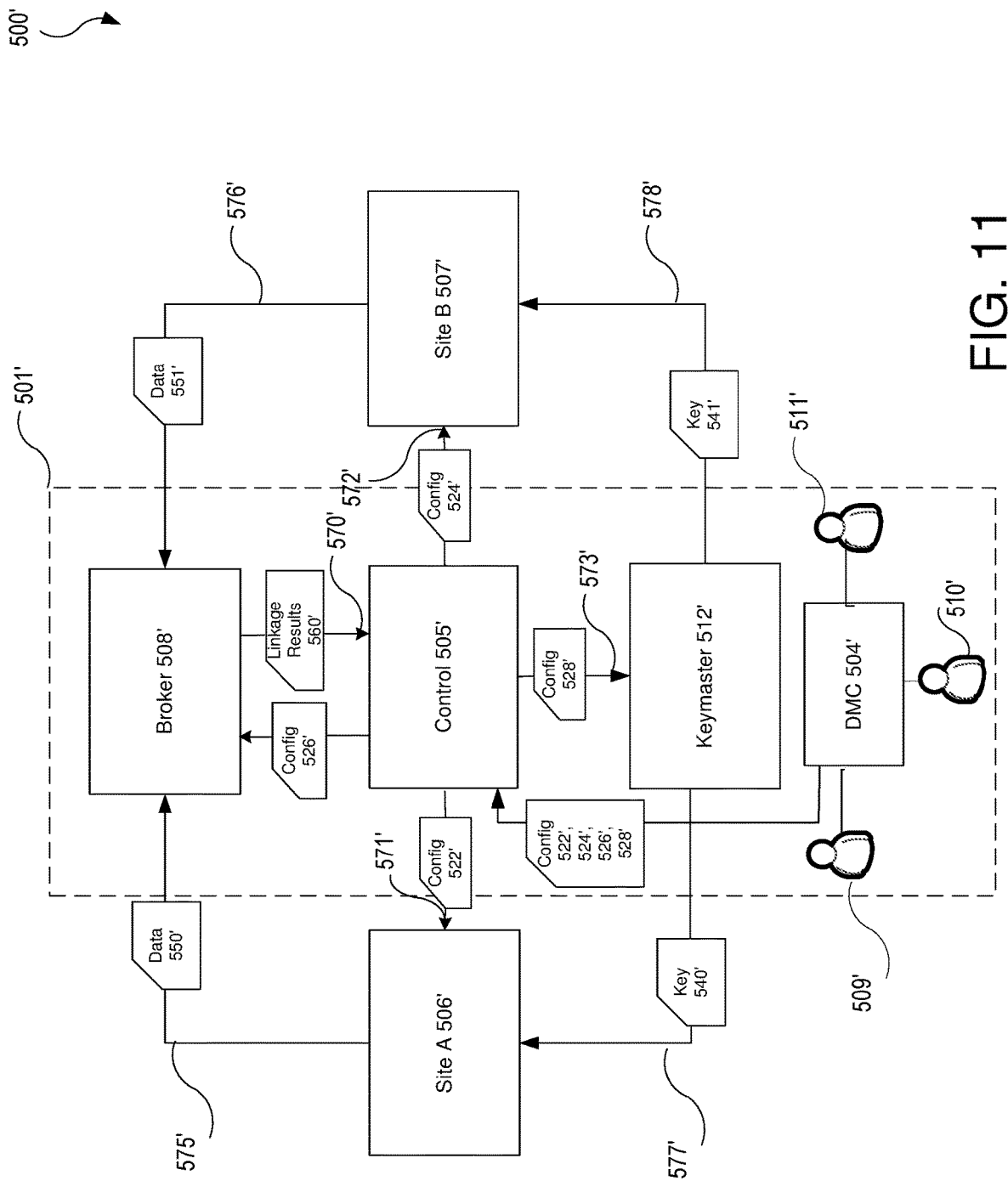
FIG. 11 illustrates a set of components of a system that may be used for linking data according to one or more embodiments of the present technology.

FIG. 11 illustrates a set of components a system for linking data according to one or more embodiments of the present technology. This second embodiment is substantially similar to FIG. 5, with the following exceptions. A record linkage system 500' is a framework to perform record linkage operations including linkage configuration and management, data standardization, data encryption and hashing, data linkage, data de-duplication, and linked data dissemination. The framework system 500' may support both centralized and distributed record linkage. The framework system 500' may implement modular software architecture which allows each module in system 500 to be updated, added or removed without the need to change the source code of the core framework. The framework system 500' supports a centralized linkage configuration mechanism and dynamic software update management. The framework system 500' includes the following: data sites or entities 506', 507' and their administration users 509', 511', a linkage platform 501' including a data mart client (DMC) 504', a control center 505', a broker 508', a user 510' and a keymaster 512'.

The DMC 504 communicates with control center 505'. The control center 505' communicates with the data sites or entities 506', 507', the broker 508', and the keymaster 512' via communication links 570'-573'. The data sites 506', 507' are not in direct communication with one another. The broker 508 communicates with data sites 506', 507' via communication links 575', 576'. The keymaster 512' communicates with data sites 506', 507' via communication links 577', 578'. The DMC acts as a proxy to the control center 505'.

The DMC 504', data sites 506', 507', the broker 508', the keymaster 512', and the control center 505' may represent a plurality of special purpose computer systems or servers (e.g., distributed or cloud based). Each of the computer systems may include one or more data storage systems which may store data entries or records. The special purpose computer systems being programmed with software and/or firmware, or as a combination of special-purpose and programmable circuitry. Hence, embodiments may include a machine-readable medium having stored thereon instructions which may be used to program a special purpose computer (or other electronic devices) to perform a process. With system 500', users 509, 510, and 511 interfaces with the control center 505' rather than their respective sites 506', 507'. The control center 504' sends config files 522', 524', 526', 528' to the DMC 505' and the DMC 504' distributes them accordingly.

Figure 12:
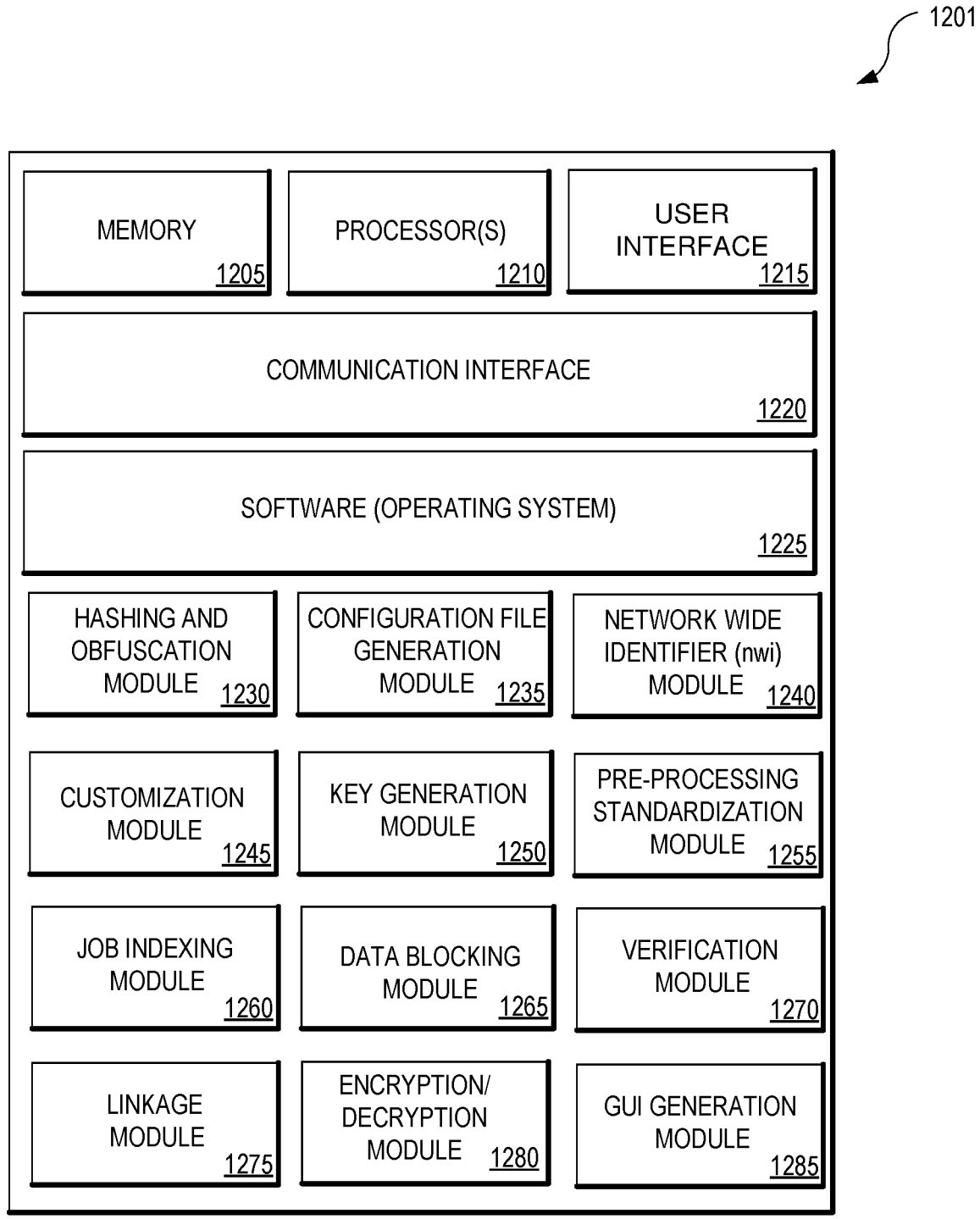
FIG. 12 illustrates a set of components that may be used in accordance with some embodiments of the present technology.

FIG. 12 illustrates computing system 1201 that is representative of any system or collection of systems in which the various processes, programs, services, and scenarios disclosed herein may be implemented. Examples of computing system 1201 include, but are not limited to, server computers, web servers, cloud computing platforms, and data center equipment, as well as any other type of physical or virtual server machine, container, and any variation or combination thereof.

Computing system 1201 may be implemented as a single apparatus, system, or device or may be implemented in a distributed manner as multiple apparatuses, systems, or devices. Computing system 1201 may be a linkage platform 150, a control center 504, 504', data sites 506, 507, 506', 507', a keymaster 512, 512', a broker 508, 508', and a data management center 505'. Computing system 1201 includes, but is not limited to, processing system or processors 1210, storage system or memory 1205, software 1225, communication interface system or module 1220, and user interface system 1215 (optional).

User interface 1215 comprises components that interact with a user to receive user inputs and to present media and/or information. User interface 1215 may include a speaker, microphone, buttons, lights, display screen, touch screen, touch pad, scroll wheel, communication port, or some other user input/output apparatus—including combinations thereof. User interface 1215 may be omitted in some examples. User interface 1215 may also be remotely located, operating as a web application, for example.

Processing system 1210 is operatively coupled with storage system 1205, communication interface system 1220, and user interface system. Processing system 1210 may comprise a micro-processor and other circuitry that retrieves and executes software 1225 from storage system 1205. Processing system 1210 may be implemented within a single processing device but may also be distributed across multiple processing devices or sub-systems that cooperate in executing program instructions. Examples of processing system 1210 include general purpose central processing units, graphical processing units, application specific processors, and logic devices, as well as any other type of processing device, combinations, or variations thereof.

Processing system 1210 loads and executes software 1225, including operating system from storage system 1205. When executed by processing system 1210, software 1225 directs processing system 1210 to operate as described herein for at least the various processes, operational scenarios, and sequences discussed in the foregoing embodiments. Computing system 1201 may optionally include additional devices, features, or functionality not discussed for purposes of brevity. Software 1225 includes and implements various components or modules that cooperate or otherwise interact to carry out the various processes and operational scenarios described herein.

Storage system 1205 may comprise any computer readable storage media readable by processing system 1210 and capable of storing software 1225. Storage system 1205 may include any type of volatile and nonvolatile, removable and non-removable media implemented in any method or technology for storage of information, such as computer readable instructions, data structures, program modules, or other data. Examples of storage media include random access memory, read only memory, magnetic disks, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, flash memory, virtual memory and non-virtual memory, magnetic cassettes, magnetic tape, magnetic disk storage or other magnetic storage devices, or any other suitable storage media. In no case is the computer readable storage media a propagated signal.

In accordance with some embodiments, memory 1205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which may be used as memory 1205. In addition to computer readable storage media, in some embodiments storage system 1205 may also include computer readable communication media over which at least some of software 1225 may be communicated internally or externally. Storage system 1205 may be implemented as a single storage device but may also be implemented across multiple storage devices or sub-systems co-located or distributed relative to each other. Storage system 1205 may comprise additional elements, such as a controller, capable of communicating with processing system 1210 or possibly other systems.

Software 1225 (including redirect process 906) may be implemented in program instructions and among other functions may, when executed by processing system 1210, direct processing system 1210 to operate as described with respect to the various operational scenarios, sequences, and processes illustrated herein.

Memory 1205 may be used to store instructions or software 1225 for running one or more applications or modules on processor(s) 1210. For example, memory 1205 could be used in one or more embodiments to house all or some of the instructions needed to execute the functionality of hashing and obfuscation module 1230, configuration file generation module 1235, operating system 1225, network wide identifier module 1240, customization module 1245, key generation module 1250, pre-processing standardization module 1255, job indexing module 1260, data blocking module 1265, verification module 1270, linkage method module 1275, encryption-decryption module 1280, and/or graphical user interface (GUI) generation module 1285. Operating system 1225 provides a software package that is capable of managing the hardware resources of computer system 1201. Operating system 1225 may also provide common services for software applications running on processor(s) 1210.

For example, the hashing and obfuscation module 1230 hashes the data and/or obfuscates the data. The configuration file generation module 1235 may be used to create a configuration file and to load or read a configuration file. The network wide identifier module 1240 associates an identifier with linked data or specific site data. The customization module 1245 covers any customization to variable or method a user may wish to apply. Key generation module 1250 utilizes a specific hash generator (e.g., salt, permutation, etc.) to generate a key for the data sites. Pre-processing standardization module 1255 covers the de-duplication, formatting, special character removal, phonetic encoding, and variable (e.g., address, name, etc.) standardization modules to convert data site data to a standard format, e.g., CSV. Job indexing module 1260 allows for editing of: a job specifics, roles and participants, job invitation, user communication, job registration, job name, job identification, software version, job expiration, job initiation, job termination, and job status. Data blocking module 1265 may block or remove heterogeneity when the sizes of the data files to be linked are moderate to large (e.g., tens of thousands of records or more). Verification module 1270 may review the data to compare it with the standard definitions as defined in the configuration file. Or may review to make sure there are no clear text data, and everything is comma separated if that if format chosen.

Linkage method module 1275 initiates the elected linkage method with the at least two data sites for comparison. With the encryption-decryption module 1280, the hashed data may also be encrypted by data sites for verification and secure transfer. GUI generation module 1285 may generate one or more GUI screens that allow for interaction with a user. In at least one embodiment, GUI generation module 1285 may generate a graphical user interface allowing a user to set preferences, review reports, author customization profiles, set device constraints, and/or otherwise receive or convey information about device customization to the user.

The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1225 may include additional processes, programs, or components, such as operating system software, virtualization software, or other application software. Software 1225 may also comprise firmware or some other form of machine-readable processing instructions executable by processing system 1210.

In general, software 1225 may, when loaded into processing system 1210 and executed, transform a suitable apparatus, system, or device (of which computing system 1201 is representative) overall from a general-purpose computing system into a special-purpose computing system customized to provide packet redirection. Indeed, encoding software 1225 on storage system 1205 may transform the physical structure of storage system 1205. The specific transformation of the physical structure may depend on various factors in different embodiments of this description. Examples of such factors may include, but are not limited to, the technology used to implement the storage media of storage system 1205 and whether the computer-storage media are characterized as primary or secondary storage, as well as other factors.

For example, if the computer readable storage media 1205 are implemented as semiconductor-based memory, software 1225 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1220 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 13:
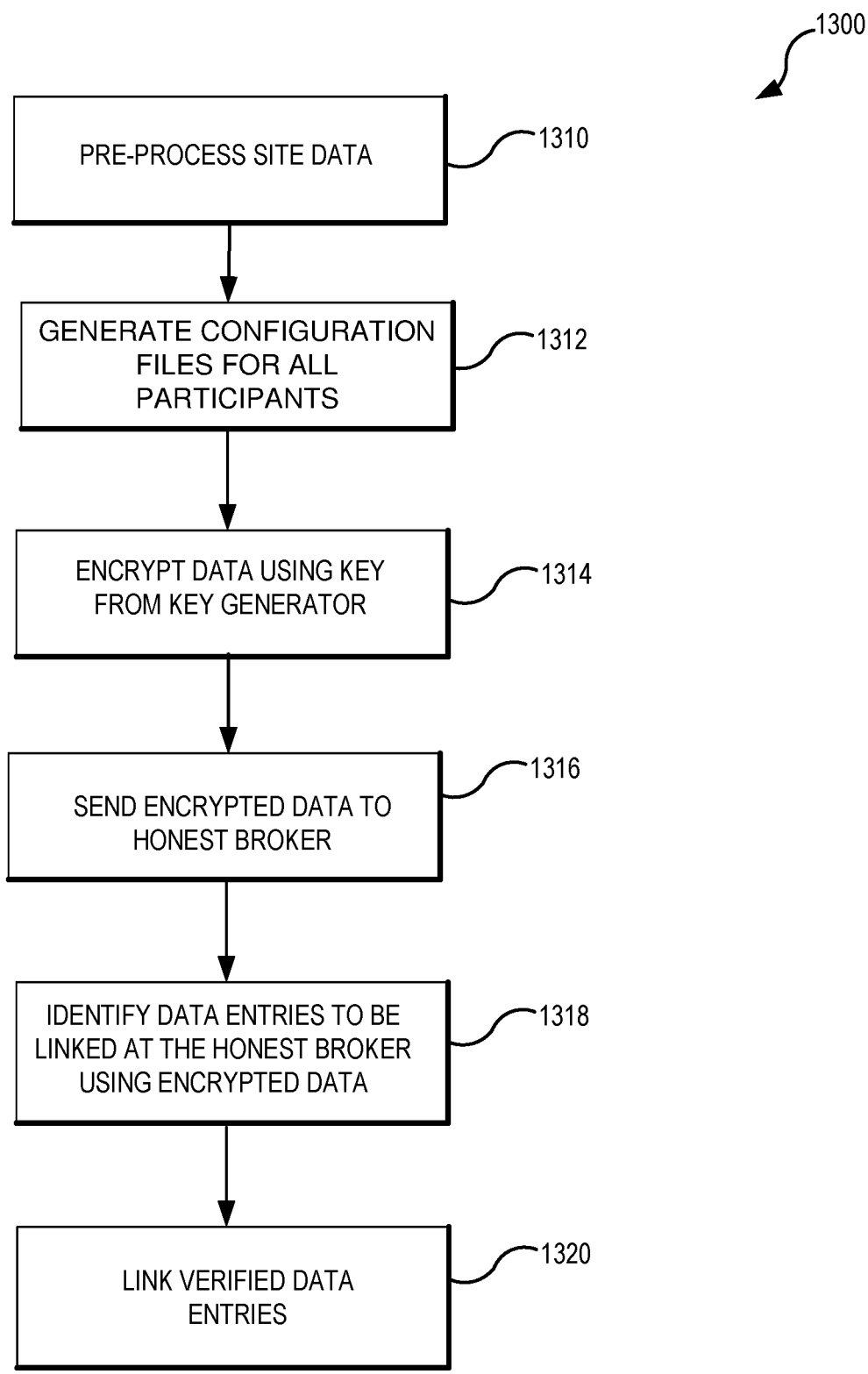
FIG. 13 is flowchart illustrating a set of operations for linking data entries according to various embodiments of the present technology.

FIG. 13 is flowchart illustrating a set of operations 1300 for linking data entries according to various embodiments of the present technology. The data is pre-processed at least two data sites (1310). Once a linkage method and variable are determined, then generate a configuration file for each participant (1312). Encrypt (1314) the data of the data sites using a key from the keymaster. Send the encrypted data to the broker (1316). Identify data entries that should be linked using the encrypted data (1318). Link the data entries and verify the data (1320).

Aspects and embodiments of the record linkage system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 14:
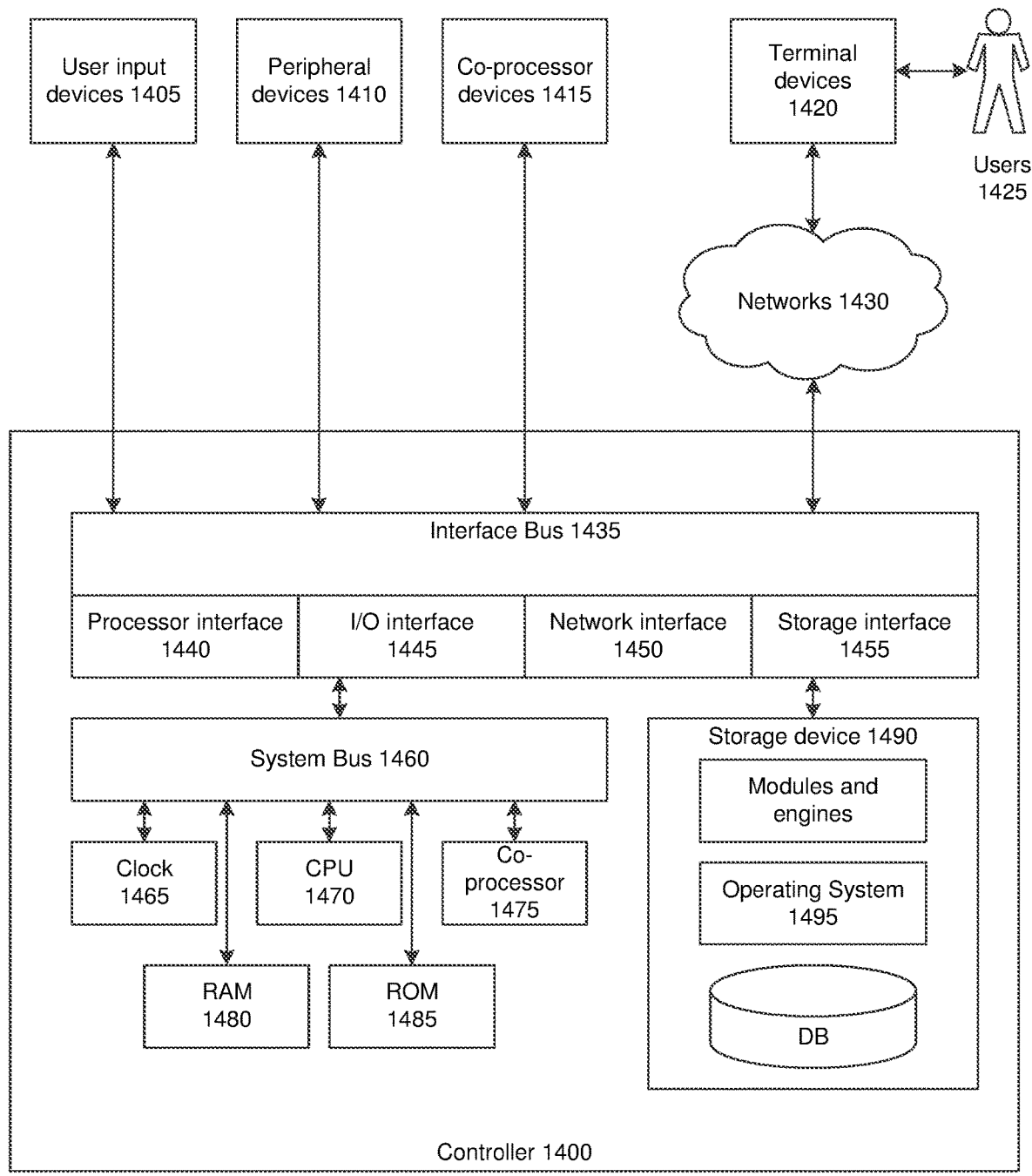
FIG. 14 is a block diagram illustrating an example machine representing the computer systemization of a record linking system.

FIG. 14 is a block diagram illustrating an example machine representing the computer systemization of a record linking system. The linkage system controller 1400 may be in communication with entities including one or more users 1425 client/terminal devices 1420 (e.g., devices 140), user input devices 1405, peripheral devices 1410, an optional co-processor device(s) (e.g., cryptographic processor devices) 1415, and networks 1430 (e.g., 160 in FIG. 1). Users may engage with the controller 1400 via terminal devices 1420 over networks 1430.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1400 may include clock 1465, CPU 1470, memory such as read only memory (ROM) 1485 and random-access memory (RAM) 1480 and co-processor 1475 among others. These controller components may be connected to a system bus 1460, and through the system bus 1460 to an interface bus 1435. Further, user input devices 1405, peripheral devices 1410, co-processor devices 1415, and the like, may be connected through the interface bus 1435 to the system bus 1460. The interface bus 1435 may be connected to a number of interface adapters such as processor interface 1440, input output interfaces (I/O) 1445, network interfaces 1450, storage interfaces 1455, and the like.

Processor interface 1440 may facilitate communication between co-processor devices 1415 and co-processor 1475. In one embodiment, processor interface 1440 may expedite encryption and decryption of requests or data. Input output interfaces (I/O) 1445 facilitate communication between user input devices 1405, peripheral devices 1410, co-processor devices 1415, and/or the like and components of the controller 1400 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1450 may be in communication with the network 1430. Through the network 1430, the controller 1400 may be accessible to remote terminal devices 1420. Network interfaces 1450 may use various wired and wireless connection protocols such as, direct connect, Ethernet, wireless connection such as IEEE 802.11a-x, and the like.

Examples of network 1430 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1450 may include a firewall which may, in some respects, govern and/or manage permission to access/proxy data in a computer network, and track varying levels of trust between different machines and/or applications. The firewall may be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, may be, for example, but are not limited to, intrusion-prevention, intrusion detection, next-generation firewall, personal firewall, etc., without deviating from the novel art of this disclosure.

Storage interfaces 1455 may be in communication with a number of storage devices such as, storage devices 1490, removable disc devices, and the like. The storage interfaces 1455 may use various connection protocols such as Serial Advanced Technology Attachment (SATA), IEEE 1394, Ethernet, Universal Serial Bus (USB), and the like.

User input devices 1405 and peripheral devices 1410 may be connected to I/O interface 1445 and potentially other interfaces, buses and/or components. User input devices 1405 may include card readers, finger print readers, joysticks, keyboards, microphones, mouse, remote controls, retina readers, touch screens, sensors, and/or the like. Peripheral devices 1410 may include antenna, audio devices (e.g., microphone, speakers, etc.), cameras, external processors, communication devices, radio frequency identifiers (RFIDs), smayners, printers, storage devices, transceivers, and/or the like. Co-processor devices 1415 may be connected to the controller 1400 through interface bus 1435, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1400 may employ various forms of memory including on-chip CPU memory (e.g., registers), RAM 1480, ROM 1485, and storage devices 1490. Storage devices 1490 may employ any number of tangible, non-transitory storage devices or systems such as fixed or removable magnetic disk drive, an optical drive, solid state memory devices and other processor-readable storage media. Computer-executable instructions stored in the memory may include linkage platform 150 having one or more program modules such as routines, programs, objects, components, data structures, and so on that perform particular tasks or implement particular abstract data types. For example, the memory may contain operating system (OS) component 995, modules and other components, database tables, and the like. These modules/components may be stored and accessed from the storage devices, including from external storage devices accessible through an interface bus.

The database components may store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1400 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1400 may be distributed electronically over the Internet or over other networks (including wireless networks). Those skilled in the relevant art(s) will recognize that portions of the record linkage system may reside on a server computer, while corresponding portions reside on a client computer. Data structures and transmission of data particular to aspects of the controller 1400 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative embodiments may employ differing values or ranges.

The teachings of the technology provided herein may be applied to other systems, not necessarily the system described above. The elements and acts of the various examples described above may be combined to provide further embodiments of the technology. Some alternative embodiments of the technology may include not only additional elements to those embodiments noted above, but also may include fewer elements.

These and other changes may be made to the technology in light of the above Detailed Description. While the above description describes certain examples of the technology, and describes the best mode contemplated, no matter how detailed the above appears in text, the technology may be practiced in many ways. Details of the system may vary considerably in its specific embodiment, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method of a linking data stored at multiple data sites having a plurality of private information contained in electronic data, the method comprising:
enabling a display of a job initiation module in a user interface, wherein the job initiation module comprises components for receiving user input that defines parameters of a linking job, and wherein the components include a key generation module, a source variable module, and an obfuscation window;
receiving the user input via the user interface, wherein the user input comprises selections of a hashing key from the key generation module, linkage variables from the source variable module, and a hashing method from the obfuscation window;
generating, at a control center server, a first configuration file based on the linkage variables, and hashing method, the first configuration file containing instructions on how to manipulate the plurality of private information contained in the electronic data stored at the data sites using the linkage variables and the hashing method to produce clean data;
transferring the first configuration file from the control center server to the data sites;
receiving the clean data from the data sites and identifying linkages in the clean data; and
providing linkage information to the data sites with which to annotate the plurality of private information, wherein the linkage information identifies the linkages in the clean data.

2. The method of claim 1, further comprising:
generating, at the control center server, a second configuration file based on the user input, wherein the user input further comprises a selection of a key generation method; and
transferring the second configuration file from the control center server to a keymaster server, wherein the keymaster server creates a hash key to be accessed by the data sites.

3. The method of claim 1, wherein the electronic data is pre-processed to normalize formatting of the electronic data, cleanse the electronic data of unwanted characters or fields, or hashing the electronic data.

4. The method of claim 1, further comprising reviewing the clean data for private information prior to transferring to an honest broker server.

5. The method of claim 1, further comprising:
generating, at the control center server, a third configuration file, the third configuration file containing instructions on how to link the clean data;
loading, at the honest broker server, the third configuration file;
receiving clean data from the data sites at the honest broker server; and
performing a record linking method as outlined in the third configuration file with the clean data from the data sites to determine linked data.

6. The method of claim 1, wherein the linkage information comprises a common linkage identifier identifying entries in electronic data that were linked.

7. The method of claim 1, further comprising, generating, at the keymaster server, a hash key and transferring the hash key from the keymaster server to the data sites which creates hashed clean data to be accessed by the honest broker.

8. A record linking platform system comprising:
one or more computer readable storage media;
a processing system operatively coupled with the one or more computer readable storage media; and
program instructions stored on the one or more computer readable storage media that when executed by the processing system, cause the record linking platform to:
enable a display of a job initiation module in a user interface, wherein the job initiation module comprises components to receive user input that defines parameters of a linking job, and wherein the components include a key generation module, a source variable module, and an obfuscation window;
receive the user input via the user interface, wherein the user input comprises selections of a hashing key from the key generation module, linkage variables from the source variable module, and a hashing method from the obfuscation window;
generate, at a control center server, a first configuration file based on the linkage variables, and hashing method, the first configuration file containing instructions on how to manipulate a plurality of private information contained in electronic data stored at multiple data sites using the linkage variables and the hashing method to produce clean data;
transfer the first configuration file from the control center server to the data sites;
receive the clean data from the data sites and identify linkages in the clean data; and
provide linkage information to the data sites with which to annotate the plurality of private information, wherein the linkage information identifies the linkages in the clean data.

9. The record linking platform of claim 8, wherein a hash key, generated at a keymaster server, is received at the data site which creates hashed clean data to be accessed by an honest broker at an honest broker server.

10. The record linking platform of claim 8, wherein the electronic data is normalized by formatting of the electronic data, cleansing the electronic data of unwanted characters or fields, and hashing the electronic data.

11. The record linking platform of claim 8, wherein the program instructions when executed by the processing system further cause the record linking platform to review the hashed clean data for private information prior to transferring to a third-party broker server.

12. The record linking platform of claim 8, wherein the program instructions when executed by the processing system further cause the record linking platform to:
generate, at the control center server, a third configuration file, the third configuration file containing instructions on how to link the hashed clean data;
load, at the honest broker server, the third configuration file;

receive hashed clean data from the data sites at the honest broker server; and perform a record linking method as outlined in the third configuration file with the hashed clean data from the data sites to determine linked data.

13. The record linking platform of claim 8, wherein the linkage information comprises common linkage identifiers identifying entries in electronic data that should be linked.

14. The record linking platform of claim 8, wherein the program instructions when executed by the processing system further cause the record linking platform to:

generate, at the control center server, a second configuration file, based on the user input, wherein the user input further comprises a selection of a key generation method; and transfer, to the keymaster server, the second configuration file, wherein the keymaster server creates a hash key to be accessed by the data sites.

15. A method comprising:

receiving, at a record linkage platform, a request to link multiple data sets, wherein the multiple data sets are stored separately at different sites by different entities and not in direct communication with one another; and in response to the request to link the multiple data sets, generating a set of configuration files including a site configuration file for each of the different sites, a key configuration file for a keymaster, and a broker configuration file for an honest broker;

wherein the site configuration file identifies a data model that each of the multiple sites will format entries of the data sets into;

wherein the key configuration file identifies an encryption method and length of encryption keys;

wherein the broker configuration file identifies the multiple data sets to be linked; and transmitting the site configuration file to each of the different sites, the key configuration file to the keymaster, and the broker configuration file to the honest broker.

16. The method of claim 15, further comprising:

loading the key configuration file at the keymaster;

generating, at a keymaster, a hash key; and transferring the hash key from the keymaster to each of the different sites.

17. The method of claim 15, wherein the set of configuration files orchestrate multiple hashing schemes executed at each of the data sites to produce hashed data sets and the method further comprises transferring the hashed data sets to an honest broker server.

18. The method of claim 17, further comprising wherein the hashed data sets are stored in a comma separated value format.

19. A record linking platform comprising:

a processor;

multiple databases each having stored thereon records, wherein each of the multiple databases are owned by different entities;

a control center configured to:

receive a request to link the records on the multiple databases; and generate a site configuration file, a key configuration file, and a broker configuration file;

a keymaster configured to:

receive the key configuration file;

generate a hash key; and transmit the hash key to any site hosting the multiple databases;

a site configured to:

receive the site configuration file and the hash key;

preprocess the records to generate evaluation records data that conform to a data model specified in the site configuration file; and encrypt the evaluation records using the hash key; and an honest broker configured to:

receive the broker configuration file and the encrypted evaluation records; and link the encrypted evaluation records without decrypting.

20. The record linking platform of claim 19, wherein the encrypted evaluation records are stored in a comma separated value format.

* * * * *